US010073902B2

(12) United States Patent
Kotagiri et al.

(10) Patent No.: US 10,073,902 B2
(45) Date of Patent: Sep. 11, 2018

(54) SNAPSHOT AND REPLICATION OF A MULTI-STREAM APPLICATION ON MULTIPLE HOSTS AT NEAR-SYNC FREQUENCY

(71) Applicant: Microsoft Corporation, Redmond, WA (US)

(72) Inventors: Sriravi Kotagiri, Hyderabad (IN); Rahul Newaskar, Hyderabad (IN); Ajay Bhave, Hyderabad (IN); Yadnyesh Joshi, Mumbai (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 498 days.

(21) Appl. No.: 14/495,685

(22) Filed: Sep. 24, 2014

(65) Prior Publication Data
US 2016/0085837 A1 Mar. 24, 2016

(51) Int. Cl.
*G06F 17/30* (2006.01)
*G06F 7/00* (2006.01)
(Continued)

(52) U.S. Cl.
CPC .... *G06F 17/30575* (2013.01); *G06F 11/2094* (2013.01); *G06F 11/2097* (2013.01);
(Continued)

(58) Field of Classification Search
CPC ........... G06F 17/30575; G06F 11/2094; G06F 11/2097; G06F 2201/82; G06F 11/1471; G06F 2201/815; G06F 2201/825
(Continued)

(56) References Cited

U.S. PATENT DOCUMENTS 6,065,018 A    5/2000  Beier et al.
7,356,679 B1 *  4/2008  Le ..................... G06F 17/30067
                                           707/E17.01
(Continued)

OTHER PUBLICATIONS

Joyce Fee: Oracle8™ Administrator's Guide Release 8.0, Dec. 1997, ORACLE®.*
Joyce Fee: Oracle8™ Administrator's Guide Release 8.0, Dec. 1997, ORACLE® (Year: 1997).*
"International Search Report & Written Opinion Issued in PCT Application No. PCT/US2015/051293", dated Jan. 20, 2016, 13 Pages.
(Continued)

*Primary Examiner* — Kuen S Lu
(74) *Attorney, Agent, or Firm* — Fiala & Weaver P.L.L.C.

(57) ABSTRACT

Storage access requests are received from one or more applications. Multiple servers update multiple virtual disks as directed by the storage access requests. The virtual disks store data that is write order dependent across the virtual disks. Logs are associated with the virtual disks. Information associated with each storage access request is stored in one of the logs. A cycle of log switching is performed. A write order consistent tracking coordinator coordinates the log switching with agents at the servers to maintain request ordering. Replication coordinators coordinate the application of the switched-out log files from primary storage to replica storage, creating a write-order consistent point on the replica side matching the primary side, and providing for failure resiliency regarding transfer of the logs. The replication logs may be received individually on the replica side from the servers on the primary side to enable highly scalable parallel/simultaneous transfers of the logs.

20 Claims, 16 Drawing Sheets

(51) Int. Cl.
*G06F 11/20* (2006.01)
*G06F 11/14* (2006.01)

(52) U.S. Cl.
CPC .... *G06F 11/1471* (2013.01); *G06F 2201/815* (2013.01); *G06F 2201/82* (2013.01); *G06F 2201/825* (2013.01)

(58) Field of Classification Search
USPC .......................................................... 707/610
See application file for complete search history.

(56) References Cited

U.S. PATENT DOCUMENTS

| | | | |
|---|---|---|---|
| 8,131,723 | B2 | 3/2012 | Sim-Tang |
| 8,335,902 | B1 | 12/2012 | Feathergill |
| 8,548,949 | B2 | 10/2013 | Jennas et al. |
| 8,689,047 | B2 | 4/2014 | Kotagiri et al. |
| 8,712,970 | B1 | 4/2014 | Sim-Tang |
| 2008/0077752 | A1* | 3/2008 | Kinoshita ........... G06F 11/0727 711/154 |
| 2011/0099342 | A1* | 4/2011 | Ozdemir ............ G06F 11/2066 711/162 |
| 2013/0283092 | A1 | 10/2013 | Das et al. |
| 2014/0040572 | A1 | 2/2014 | Kotagiri et al. |
| 2014/0344809 | A1* | 11/2014 | Jin ..................... H04L 67/2823 718/1 |

OTHER PUBLICATIONS

"International Preliminary Report on Patentability Issued in PCT Application No. PCT/US2015/051293", dated Jul. 15, 2016, 7 Pages.

Shenoy, Roopesh, "Making Microsoft Sync Framework Work with PostgreSql", Published on: Mar. 18, 2011 Available at: http://www.infoq.com/articles/Microsoft-Sync-Framework-PostgreSql, 17 pages.

"EMC Recover Point/SE for the CLARiiON CX4", in EMC White Paper, Feb. 2010, 19 pages.

Laverick, Michael Gordon, "Administering VMware Site Recovery Manager 5.0: Configuring the Protected Site", Published on: Feb. 28, 2012, Available at: http://www.pearsonitcertification.com/articles/article.aspx?p=1828678&seqNum=5, 6 pages.

Siebert, Eric, "A look at VMware vSphere Replication for Site Recovery Manager 5", Published on: Sep. 24, 2011, Available at: http://searchdisasterrecovery.techtarget.com/tip/A-look-at-VMware-vSphere-Replication-for-Site-Recovery-Manager-5, 5 pages.

"Introduction to VMware vSphere® Replication", in Technical White Paper, Sep. 15, 2012, 10 pages.

Sharma, Nirmal, "A Practical Guide to Microsoft Hyper-V Replica", Published on: Jun. 10, 2013, Available at: https://www.simple-talk.com/sysadmin/virtualization/a-practical-guide-to-microsoft-hyper-v-replica-part-i/, 24 pages.

* cited by examiner

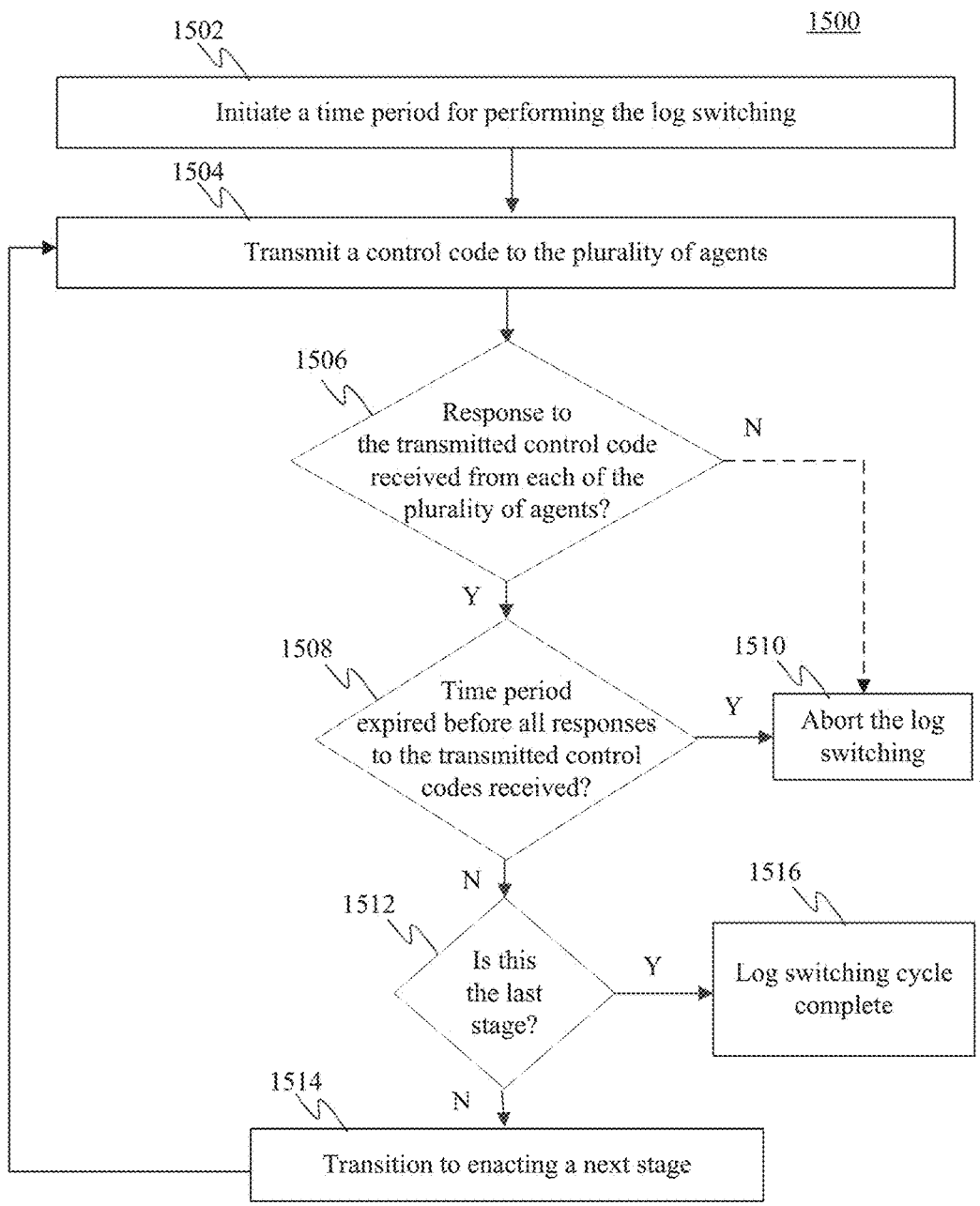

SNAPSHOT AND REPLICATION OF A MULTI-STREAM APPLICATION ON MULTIPLE HOSTS AT NEAR-SYNC FREQUENCY

CROSS-REFERENCE TO RELATED APPLICATION(S)

This application is related to the following U.S. patent application, which is incorporated by reference herein in its entirety:

U.S. patent application Ser. No. 13/564,449, titled "Request Ordering Support When Switching Virtual Disk Replication Logs," filed Aug. 1, 2012.

BACKGROUND

As computers have become more commonplace, individuals and businesses have become increasingly reliant on reliable computer systems. Recovery mechanisms can be implemented to protect against various malfunctions, such as power failures, hardware and/or software errors, and so forth. The operating system and/or other control programs of a computer can provide various recovery mechanisms.

Storage replication may be used to protect against the loss of stored data. According to storage replication, multiple storage units may be used to redundantly store the same data. In this manner, redundant copies of data are maintained in case of failure of one of the storage units. Various types of storage replication exist. For example, synchronous replication may be used, which guarantees that any write of data is completed in both primary and backup (or "replica") storage. Alternatively, asynchronous replication may be used, where a write of data is typically considered to be complete when it is acknowledged by primary storage. The data is also written to backup storage, but frequently with a small time lag. Thus, the backup storage is not guaranteed to be synchronized with the primary storage at all times.

High-availability clusters (also known as HA clusters or failover clusters) are groups of computers that frequently use asynchronous storage replication. An HA cluster uses redundant computers in groups or clusters that provide continued service when system components fail. Without clustering, if a server running a particular application crashes, the application will be unavailable until the crashed server is fixed. HA clustering remedies this situation by detecting hardware/software faults, and immediately restarting the application on another system without requiring administrative intervention, a process known as failover. HA clusters are often used for critical databases, file sharing on a network, business applications, and customer services such as electronic commerce websites. HA cluster implementations attempt to build redundancy into a cluster to eliminate single points of failure, including using multiple network connections and data storage which is redundantly connected via storage area networks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for write order consistent tracking. Storage access requests, such as write requests, are received from one or more applications (e.g., a distributed application). Storage request processing modules at multiple servers update multiple virtual disks as directed by the storage access requests. The virtual disks are primary storage that store data that is write order dependent across the virtual disks. Logs are associated with the virtual disks. Replication management modules store information associated with each storage access request in one of the logs associated with the virtual disks. A cycle of log switching is performed for the logs. A write order consistent tracking coordinator coordinates the log switching with agents at the servers to maintain request ordering. A replication coordinator coordinates the application of the switched-out log files to replica storage, to synchronize the replica storage with the primary storage.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 14 shows a process for using control codes to coordinate log switching, according to an example embodiment.

FIG. 15 shows a flowchart providing a process for using control codes to coordinate a stage of log switching, according to an example embodiment.

Figure 1:
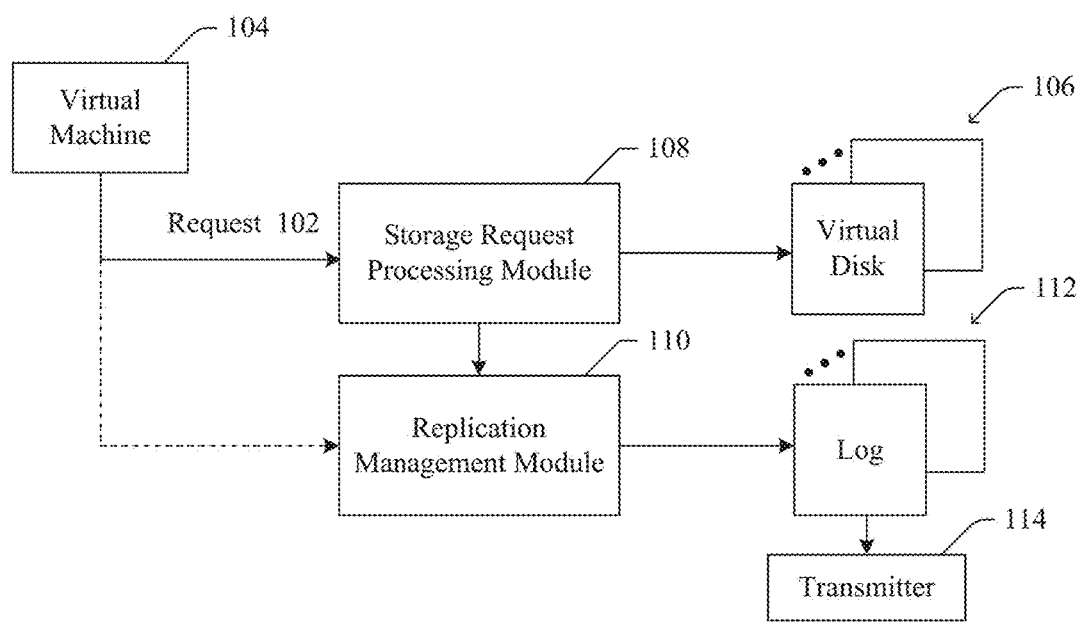
FIG. 1 illustrates an example system implementing the request ordering support when switching virtual disk replication logs in accordance with one or more embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Request ordering support when switching virtual disk replication logs is discussed herein. Storage access requests, such as write requests, are received from a virtual machine. A storage request processing module updates one of multiple virtual disks as directed by each of the storage access requests. Additionally, a replication management module stores information associated with each storage access request in one of multiple logs. The logs can be transferred to a recovery device at various intervals and/or in response to various events, which results in switching logs so that the replication management module stores the information associated with each storage access request in a new log and the previous (old) log is transferred to the recovery device. During this switching, request ordering for write order dependent requests is maintained at least in part by blocking processing of the information associated with each storage access request.

Various embodiments are discussed herein in terms of virtual machines. Virtualization generally refers to an abstraction from physical resources. Hardware emulation involves the use of software that represents hardware that the operating system would typically interact with. Hardware emulation software can support guest operating systems, and virtualization software such as a hypervisor can establish a virtual machine (VM) on which a guest operating system operates. Much of the description herein is described in the context of virtual machines, but the techniques discussed herein are equally applicable to physical machines that do not employ virtualization.

To enable recovery of a device in the event of a malfunction, the information associated with that device is provided to a recovery device. In the context of virtual machines, a base replication can be provided, and updates or changes to that base replication can be provided as the virtual machine is running on its primary device.

The techniques discussed herein support systems in which differencing disks or other similar mechanisms are not needed to provide virtual storage replication and virtual machine recovery. In one or more embodiments, one or more logs (e.g., log files), also referred to as replication logs, are created that capture changes being made to a storage device, including a virtual disk. In one virtual machine embodiment, the logs can be created by preserving duplicates of change requests that are queued for inclusion into the virtual disk. The log processing and updating can be performed in parallel with the processing that updates the virtual disk, such that replicated data is created without additional latencies, and the logs can be prepared in such a way that it can be easily transferred to a recovery device(s) while limiting the impact on the Input/Output Operations Per Second (IOPS) to the running workload. Thus, while the techniques discussed herein may be used in addition to technologies such as differencing disks when used for other purposes, replication may be effected without the existence of any differencing disks in accordance with the disclosure.

In one or more embodiments, a virtual machine's write requests that are destined for a virtual disk are copied to a log data structure, such as a log queue. The log entries are taken from the queue and processed into a log. Writes to the log can be accumulated in memory, versus storage such as a virtual disk, disk or other physical storage. The write request information may be accumulated in memory before writing to the physical disk in order to, for example, reduce the impact on workload performance and response times inside the virtual machine. The writes to the log may be coordinated with the writes to the virtual disk file (e.g., virtual hard disk or "VHD" file) to, among other things, facilitate application-consistent snapshots of virtual machines. Further, the log format can be agnostic to virtual hard disk file format and type, such that it can be used to capture changes to a virtual disk of any type and format.

The following section describes embodiments for switching a replication log associated with storage. A current log (e.g., a log file that has been used to store indications of storage requests that are applied in parallel to primary storage) is switched out for a new log. The current log may then be applied to replica storage to synchronize the replica storage with primary storage while maintaining write order dependency. A subsequent section describes embodiments for switching multiple replication logs that are associated with multiple primary storage instances, where a write order dependency is present across the primary storage instances (e.g., the storage instances are written to by a distributed application, etc.). This is followed by a still further section that describes embodiments for applying replication logs to replica storage in a manner that maintains write order dependency across multiple instances of replica storage.

II. Example Embodiments for Request Ordering Support when Switching Virtual Disk Replication Logs FIG. 1 illustrates an example system 100 implementing the request ordering support when switching virtual disk replication logs in accordance with one or more embodiments. Storage access requests 102 may be provided by any source, such as a virtual machine (VM) 104. Although illustrated as being provided by virtual machine 104, storage requests 102 can additionally or alternatively be provided by other components or modules, such as processors or other sources. The storage access requests 102 may be any type of storage access requests, such as write requests, requests to expand or contract the disk, or any other storage operations that can result in changes to the disk. In one or more embodiments, the storage access requests 102 represent write requests to store data.

In the illustrated embodiment, the data is stored in one or more virtual disks 106, each of which can represent one or more files stored on physical storage media. A storage request processing module 108 directs and processes incoming requests 102 to the virtual disks 106. For example, the requests 102 may represent write requests that are temporarily buffered at storage request processing module 108 until they can be used to update a virtual disk 106. Each virtual disk 106 may include a single virtual storage file (e.g., VHD file) or multiple files (e.g., a VHD file and one or more differencing disk files (also referred to as AVHD files)). Thus, for example, changes to a virtual disk 106 may be made to a single file representing the virtual disk 106, and logs as discussed herein may be used in lieu of differencing disks or similar states of the virtual disk 106 for replication purposes.

Replication management module 110 receives the same storage access requests 102 that are being received at storage request processing module 108. Storage access requests 102 may be received in different manners, such as from the virtual machine 104, from an intermediate module (not shown), from storage request processing module 108 itself, and so forth. In one or more embodiments, replication management module 110 is implemented integrally with storage request processing module 108. In such situations, replication management module 110 may receive a copy of the storage access requests 102 upon receipt of the requests 102 at storage request processing module 108, or storage request processing module 108 may create and provide a copy of storage access requests 102 to replication management module 110. It should be noted that modules such as storage request processing module 108 and replication management module 110 can be implemented in different manners. For example, module 108 and/or module 110 may be provided within the virtual machine 104, may be provided by a hypervisor, may be provided by a parent partition operating system or other operating system, and so forth.

Replication management module 110 can buffer the storage access requests 102 in parallel with the buffering and/or processing of the storage access requests 102 by the storage request processing module 108. The buffered storage access requests 102 are written to one or more logs 112, such as a log file, for replication purposes and typically without significantly impacting storage IOPS. Typically, each virtual disk 106 has a corresponding log 112. As write requests or other storage access requests 102 are being processed to update the virtual disks 106 in response to virtual machine 104 processing, replication management module 110 tracks changes to the virtual disks 106 in one or more logs 112.

At various intervals and/or in response to various events, logs 112 can be transmitted, such as via transmitter 114, elsewhere (e.g., to a recovery device) where a recovery system or virtual machine may be instantiated to replicate the virtual machine 104. Transmitter 114, which may be a stand-alone transmitter or associated with another device (e.g., a transceiver, a network interface module, etc.), can provide the log 112 to a destination such as a recovery system or server as a recovery replica of at least a portion of a virtual disk 106. When one log is transmitted elsewhere, the log being transferred is referred to as the old log, and a new log is created. The buffered storage access requests are then written to the new log rather than the old log. This process of changing from storing the storage access requests in the new log rather than the old log is also referred to as log switching.

Figure 2:
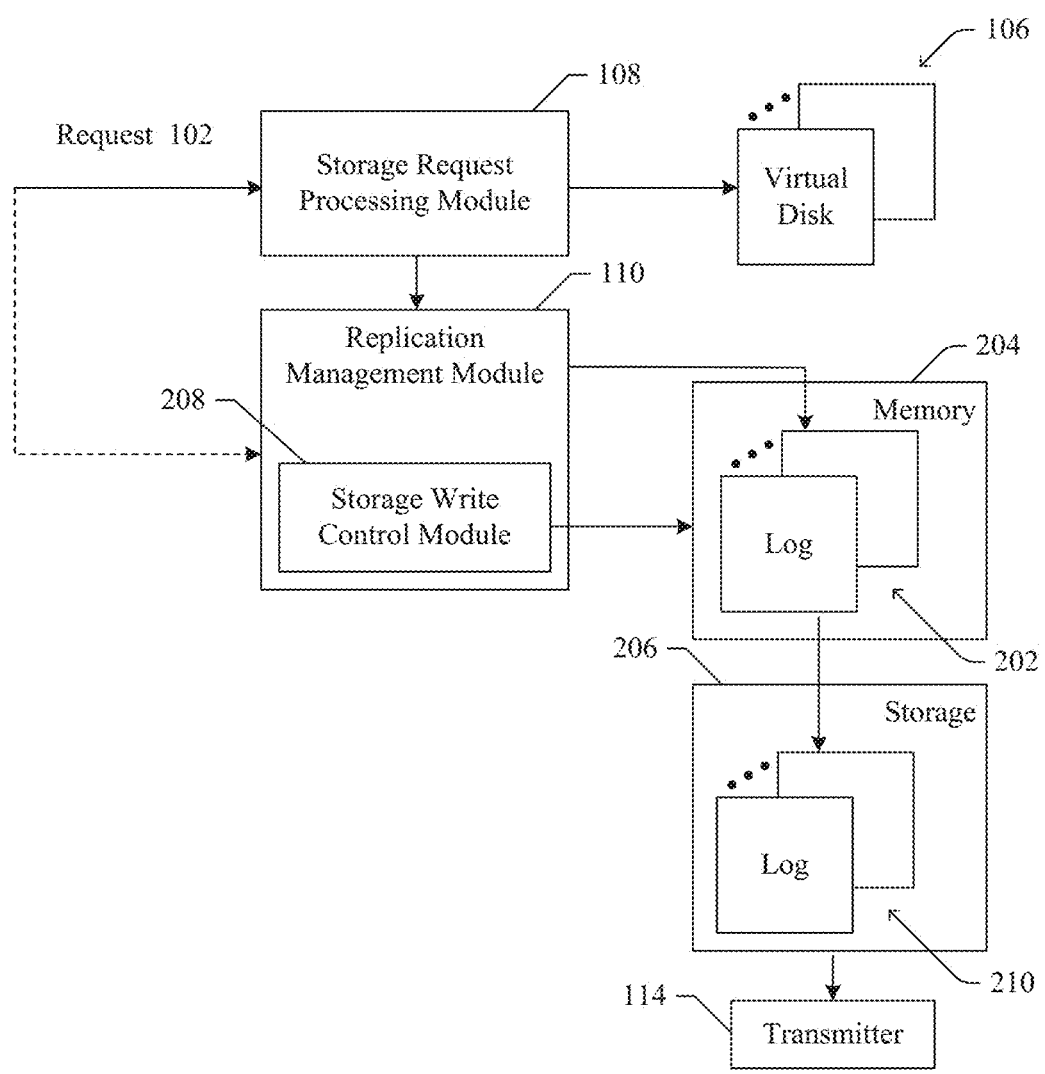
FIG. 2 illustrates another example system implementing the request ordering support when switching virtual disk replication logs in accordance with one or more embodiments.

FIG. 2 illustrates another example system 200 implementing the request ordering support when switching virtual disk replication logs in accordance with one or more embodiments. System 200 is similar to system 100 of FIG. 1, including storage (e.g., write) requests 102, one or more virtual disks 106, a storage request processing module 108, and a replication management module 110. In system 200, a virtual machine or other source issues write requests 102 that will ultimately change one or more virtual disks 106 with the data being written thereto. Both storage request processing module 108 and replication management module 110 receive the write requests 102. As storage request processing module 108 processes the write requests 102 for inclusion on a virtual disk 106, replication management module 110 queues the write requests 102 for writing to one or more logs 202.

In one or more embodiments, logs 202 are captured in memory 204 (e.g., random access memory) to reduce input/output (I/O) processing and improve TOPS relative to solutions involving writing to disk such as differencing disks. Each log 202 may be written to storage 206 (e.g., a magnetic or optical disk, a Flash memory drive, etc.) at desired regular or irregular intervals such as, for example, fixed intervals, random intervals, intervals based on triggered events (e.g., the size of all logs 202 in memory 204, the size of a particular log 202 in memory 204, etc.), and so forth. Replication management module 110 includes a storage write control module 208 that determines when a log 202 in memory 204 is to be written to storage 206 as illustrated by one or more logs 210. In one or more embodiments, storage write control module 208 writes a log 202 to storage 206 as a log 210 when memory 204 that has been allocated for the log 202 reaches a threshold. Each log 210 is typically a single file in storage 206, but can alternatively be multiple files and/or portions of a file (e.g., multiple logs may be stored in a single log file). For example, a write of a log 202 from memory 204 to log 210 in storage 206 may occur when the allocated memory for log 202 reaches 90% capacity. In one or more embodiments, storage write control module 208 also writes a log 202 to storage 206 as a log 210 when the log for the corresponding virtual disk 106 is to be switched to a new log, as discussed in more detail below. By accumulating write requests 102 in memory 204 and infrequently writing the logs to physical storage 206, the impact on virtual machine workload performance and response times inside the virtual machine can be reduced.

At various intervals and/or in response to various events, logs 202 and/or 210 can be transmitted, such as via transmitter 114, elsewhere as discussed above with reference to FIG. 1. When one log is transmitted elsewhere, the buffered storage access requests are then written to the new log rather than the old log.

In systems 100 of FIG. 1 and 200 of FIG. 2, virtual machines or other sources may issue storage access requests having particular ordering requirements. For example, database, mail server, or other applications in the virtual machine may implement their own recovery mechanisms and desire to have particular storage access requests (e.g., particular writes) occur in a particular order as part of those recovery mechanisms. Replication management modules 110 account for these ordering requirements when switching logs, as discussed in more detail below.

Figure 3:
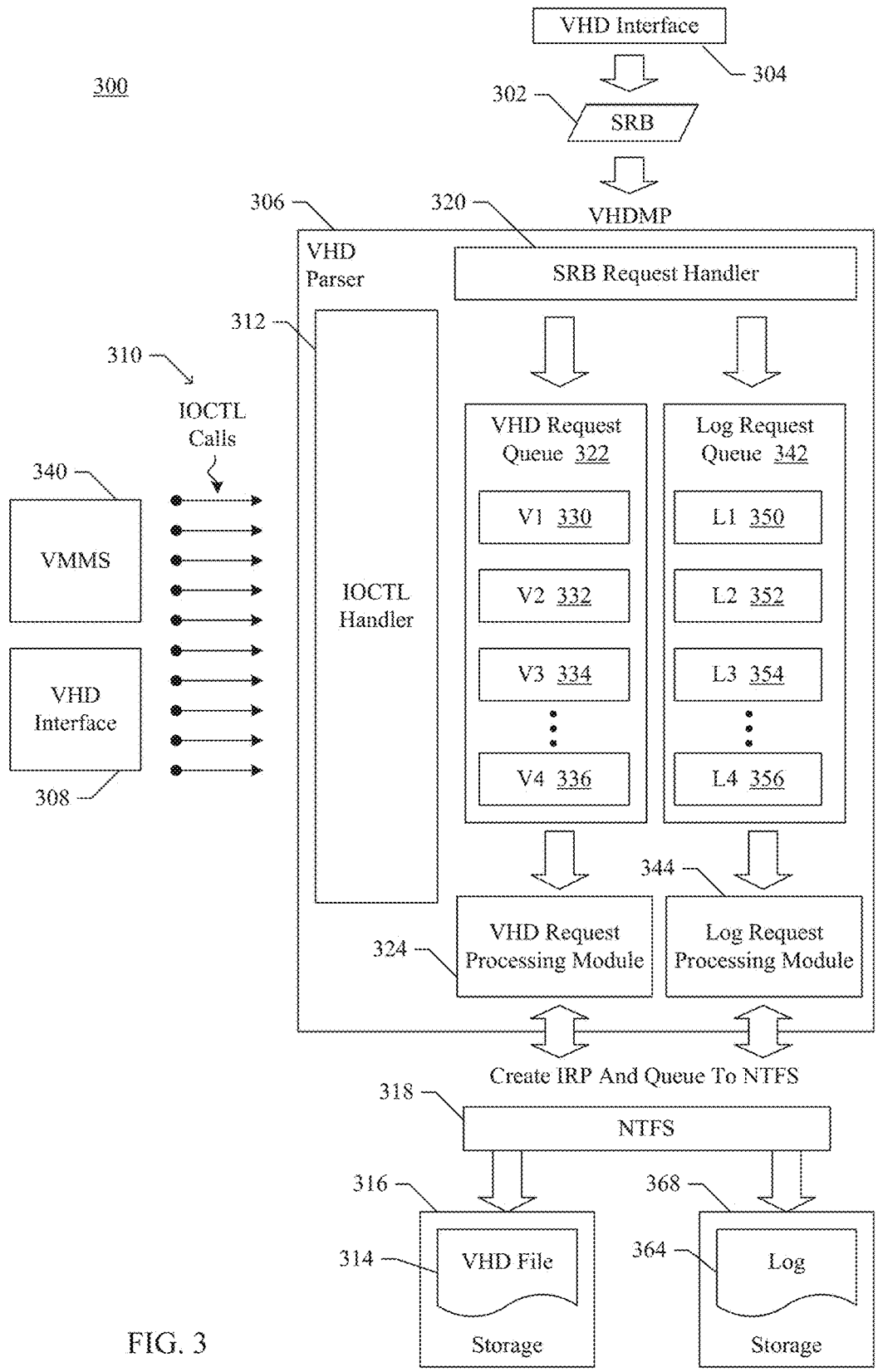
FIG. 3 illustrates an example architecture for implementing the request ordering support when switching virtual disk replication logs in accordance with one or more embodiments.

FIG. 3 illustrates an example architecture 300 for implementing the request ordering support when switching virtual disk replication logs in accordance with one or more embodiments. Architecture 300 can implement, for example, a system 100 of FIG. 1 or a system 200 of FIG. 2. Architecture 300 is discussed with reference to the storage access requests being I/O write requests, although various other types of storage access requests can also be processed by architecture 300. In the example architecture 300 the write requests are implemented as small computer system interface (SCSI) request blocks (SRBs) 302. SRB 302 is a representative manner in which an I/O request can be submitted to a storage device. SRB 302 may include information such as the command to send to the device, the buffer location and size, and so forth. In one or more embodiments, each change request to a virtual disk is in the form of an SRB 302. While SRBs are discussed as an example, it should be noted that various other I/O request types can be used with the techniques discussed herein.

In the illustrated example, SRB 302 is provided by an interface to upper layers, shown as virtual hard disk (VHD) interface 304 (e.g., which may be implemented in a VHD parser system or .sys file). In this example, VHD interface 304 represents an internal interface to the upper layers, which performs internal translation and sends SRB 302 to a replication management module, which in FIG. 3 is part of virtual disk parser 306. Storage requests may also be provided via the VHD interface 308, which is also an interface to upper layers, where the storage requests may be provided via an input/output control (IOCTL) call 310 that is handled by an IOCTL handler 312 of virtual disk parser 306. IOCTL handler 312 provides an interface through which an application on the virtual machine can communicate directly with a device driver using control codes. Thus, storage access requests may be received via one or more different input types.

In one or more embodiments, virtual disk parser 306 can be an adaptation of a VHD mini-port, such as VHDMP.sys available in the Hyper-V® virtualization system available from Microsoft Corporation of Redmond, Wash. Assuming in this example that the virtual disk is represented by a VHD file 314, the storage stack for such VHD files 314 can include a mini-port driver such as VHDMP.sys, which represents VHD parser 306. VHD parser 306 enables I/O requests to the VHD file 314 in storage 316 (e.g., a magnetic or optical disk, a Flash memory drive, etc.) to be sent to the host file system. The host file system is illustrated as a new technology file system (NTFS) 318, although various other host file systems can alternatively be used.

For purposes of example, it is assumed in the description of example architecture 300 that SRBs 302 include write requests to change a virtual disk such as VHD file 314. SRBs 302, which originate inside the virtual machine, reach virtual disk parser 306 at SRB request handler 320. In one or more embodiments, SRB request handler 320 creates an instance of a custom data structure for each SRB 302, and embeds the SRB 302 inside this instance which is added to VHD request queue 322. VHD request queue 322 maintains the write requests to VHD file 314 that are pending for processing. SRB request handler 320 adds these SRBs 302 to queue 322, and as described below VHD request processing module 324 removes the write requests from VHD request queue 322 to process the write requests. Multiple representative VHD request queue 322 entries are depicted as V1 330, V2 332, V3 334 and V4 336. VHD request queue 322 and VHD request processing module 324 together can be a storage request processing module 108 of FIG. 1 or FIG. 2.

In one or more embodiments, IOCTL handler 312 may also receive requests from management modules, such as virtual machine management service (VMMS) 340 (e.g., an executable or .exe file) provided as part of the Hyper-V® virtualization system. VMMS 340 generally represents a management service that serves as a point of interaction for incoming management requests. VMMS 340 can provide requests to IOCTL handler 312 for enabling and disabling change tracking for a virtual disk. For example, VMMS 340 may issue a request via an IOCTL call 310 to IOCTL handler 312, which causes log request queue 342 and log request processing module 344 to be initialized. VMMS 340 can also provide requests to IOCTL handler 312 for managing the switching of logs while the virtual machine is running. For example, VMMS 340 may issue requests to advance virtual disk parser 306 through multiple stages of switching logs, as discussed in more detail below.

When change tracking is enabled, another instance of the custom data structure for the SRB 302 that is added to VHD request queue 322 is created and added as an entry to log request queue 342. In one or more embodiments, a data buffer of write requests (e.g., SRBs 302) may be shared by the custom data structure instances for the SRBs 302 in both VHD request queue 322 and log request queue 342. Log request queue 342 maintains the log write requests that are pending for processing. Representative log request queue 342 entries are depicted as L1 350, L2 352, L3 354 and L4 356. Entries of log request queue 342 and VHD request queue 322 correspond to one another—an entry of log request queue 342 that includes the same SRB 302 (or references the same shared SRB 302) as an entry of VHD request queue 322 is referred to as corresponding to or being associated with that entry of VHD request queue 322. Log request queue 342 and log request processing module 344 together can be a replication management module 110 of FIG. 1 or FIG. 2.

VHD request processing module 324 removes queued write requests from queue entries 330-336 of VHD request queue 322 to process the write requests. VHD request processing module 324 processes write requests by writing the requested data to VHD file 314. Based on the virtual hard disk format and type, in one or more embodiments VHD request processing module 324 sends one or more I/O request packets (IRPs) to VHD file 314 via NTFS 318 to complete each write request.

Log request processing module 344 removes queued write requests from log queue entries 350-356 of log request queue 342 to process the write requests. Log request processing module 344 processes the write requests or log queue entries by storing in log 364 the log queue entries 350-356 that include the write requests. Log 364 can be one or more log files, and the log queue entries 350-356 can be stored to the one or more log files via NTFS 318. Thus, log request queue 342 is copied to log 364 that, in the illustrated embodiment, is stored in storage 368 (e.g., a magnetic or optical disk, a Flash memory drive, etc.). Storage 368 may be the same or different storage as storage 316 in which the VHD files are stored. It should be noted that in one or more embodiments, while the log 364 may be stored in some storage 368, the log is cached or otherwise buffered in memory (e.g., random access memory) until a time when the log is to be sent to storage 368. Log request processing module 344 processing the write requests or log queue entries includes storing the log queue entries 350-356 that include the write requests in such a cache or buffer.

New log entries for write requests are created for each new storage request and placed in log request queue 342, typically substantially in parallel with the creating and placing of a new VHD request queue entry for the write request in VHD request queue 322. Similarly, the next write request in log request queue 342 is removed and copied to log 364, typically substantially in parallel with the corresponding entry for the write request being removed from VHD request queue 322 and processed by VHD request processing module 324. VHD request queue 322 and log request queue 342 are typically first-in-first-out (FIFO) queues, although other queuing techniques can alternatively be used.

A particular queued write request (e.g., a request in one of queue entries 330-336) is considered to be complete in response to two conditions being satisfied: 1) all of the issued IRPs to VHD file 314 for the write request are completed, and 2) the log request queue entry corresponding to the VHD request queue entry that includes the write request is written to log 364. The log request queue entry being written to log 364 refers to the log request queue entry being added to the log regardless of whether the log is cached or otherwise buffered in memory (e.g., the log request queue entry can be written to log 364 even though the log, and thus the log request queue entry, is being maintained in a buffer or other memory rather than storage 368). In response to a particular write request being complete, VHD parser 306 returns a completion response for the particular write request to the virtual machine from which the particular write request was received. The completion response can be returned to the virtual machine by any of various components or modules of virtual parser 306.

In one or more embodiments, the log can be stored (at least temporarily) in memory as discussed above. The log stored in memory can be directly transmitted to one or more recovery devices from memory. Alternatively, the log can be written to a physical storage medium (e.g., magnetic or optical disk, Flash memory disk, etc.) and subsequently transmitted elsewhere (e.g., to one or more recovery devices) from the physical storage medium. Regardless of whether the log is transmitted from memory or a physical storage medium, various conditions can dictate when the log will be transmitted elsewhere. The condition may be, for example, a time, a time duration, a triggering event, and so forth. For example, the condition may be a particular time interval (e.g., five minutes), a particular event (e.g., a log file reaching a threshold size and/or having a threshold number of entries), and so forth. The recovery devices can be any of a variety of different recovery servers and/or recovery storage devices.

When the log, referred to as the old log, is transmitted elsewhere (e.g., to a recovery device), a new log is created. Log request processing module 344 then proceeds to store entries in log request queue 342 into the new log. This process of changing from storing entries in log request queue 342 into the new log rather than the old log is also referred to as log switching.

The recovery device is a separate computing device from the device implementing architecture 300 and/or a separate storage device from storage 316 (and storage 368). The recovery device receives the transmitted log and maintains or otherwise uses the transmitted log for recovery purposes. For example, if a malfunction were to occur in the device implementing architecture 300, then the logs received by the recovery device can be used to recreate VHD file 314. The recovery device can maintain or otherwise use the transmitted log in different manners. In one or more embodiments, the recovery device stores the log, allowing the requests in the log to be subsequently applied, if recovery of VHD file 314 is desired, to a previously stored copy of VHD file 314 (a copy of VHD file 314 that does not include the changes indicated in the log, and that is stored on the recovery device or elsewhere) in order to recover VHD file 314. Alternatively, the requests in the log can be processed and applied to a previously stored copy of VHD file 314 (a copy of VHD file 314 that does not include the changes indicated in the log, and that is stored on the recovery device or elsewhere), allowing a duplicate copy of VHD file 314 to be maintained at the recovery device. The request in the log can be processed and applied to a previously stored copy of VHD file 314 in a manner analogous to that performed by VHD request processing module 324 in processing requests in VHD request queue 322 as discussed above.

Log 364 includes the storage requests from log request queue 342, as well as sufficient additional data for VHD file 314 to be recovered and/or replicated. Log 364 can include various data and/or metadata regarding the storage requests stored in log 364 from log request queue 342 and VHD file 314. In one or more embodiments, log 364 includes a header portion, one or more metadata portions, and one or more data portions. The one or more data portions include the entries from the log request queue (or alternatively the data from the entries of the log request queue) that include the write requests or other storage requests.

The header portion includes, for example, information to identify the log, information to indicate the size of one or more metadata portions, information to indicate how many metadata portions are included in the log, and information to indicate the location of the last valid data of the log (the end of the log or EOL). The header portion can include various other information, such as a version identifier of the log, a time stamp indicating when the log was created (and/or last modified), a size of the log, a checksum for the log, an error code (e.g., indicating whether an error occurred in creating or receiving the log), and so forth.

Each metadata portion includes, for example, a metadata header and one or more metadata entries. The metadata provides, for example, information describing the changes to the virtual disk (the VHD file). For example, the metadata header can include an indication of the size of the metadata header, an indication of the location of the previous metadata portion in the log, an indication of the location of the next metadata portion in the log, an indication of the number of metadata entries in the metadata portion, a checksum value for the metadata portion, and so forth. Each metadata entry provides, for example, information about the virtual disk address range that is modified. For example, each metadata entry can include a byte offset that indicates an actual physical address on the virtual disk that was modified, a checksum value for the metadata entry, a data length indicating a size of the data in a data portion, a timestamp value indicating a time and/or date when the storage request resulting in the data in a data portion was received by the VHD parser, the meta operation of the data in a data portion (e.g., a write operation, a no operation (NOOP), etc.), and so forth.

In the example architecture 300, although one VHD file 314 and one log 364 are illustrated, in one or more embodiments architecture 300 includes multiple VHD files 314 (stored in the same and/or different storage 316) as well as multiple logs 364 (stored in the same and/or different storage 368). VHD parser 306 can include a separate VHD request queue for each VHD file with each VHD request queue corresponding to a single VHD file, or alternatively a single VHD request queue can correspond to (and thus include entries for) multiple different VHD files. VHD parser 306 can also include a separate log request queue for each log with each log request queue corresponding to a single log, or alternatively a single log request queue can correspond to (and thus include entries for) multiple different logs.

In situations in which the system (e.g., system 100 of FIG. 1 and/or system 200 of FIG. 2) or architecture (e.g., architecture 300 of FIG. 3) includes multiple logs, the log switching includes switching of all of the multiple logs at approximately the same time. However, there is typically no guaranteed ordering in which the logs are switched, typically no dependency on one log being switched before another, and typically no guaranteed speed at which the logs are switched. Accordingly, a virtual machine cannot rely on logs being switched in a particular order.

Figure 4:
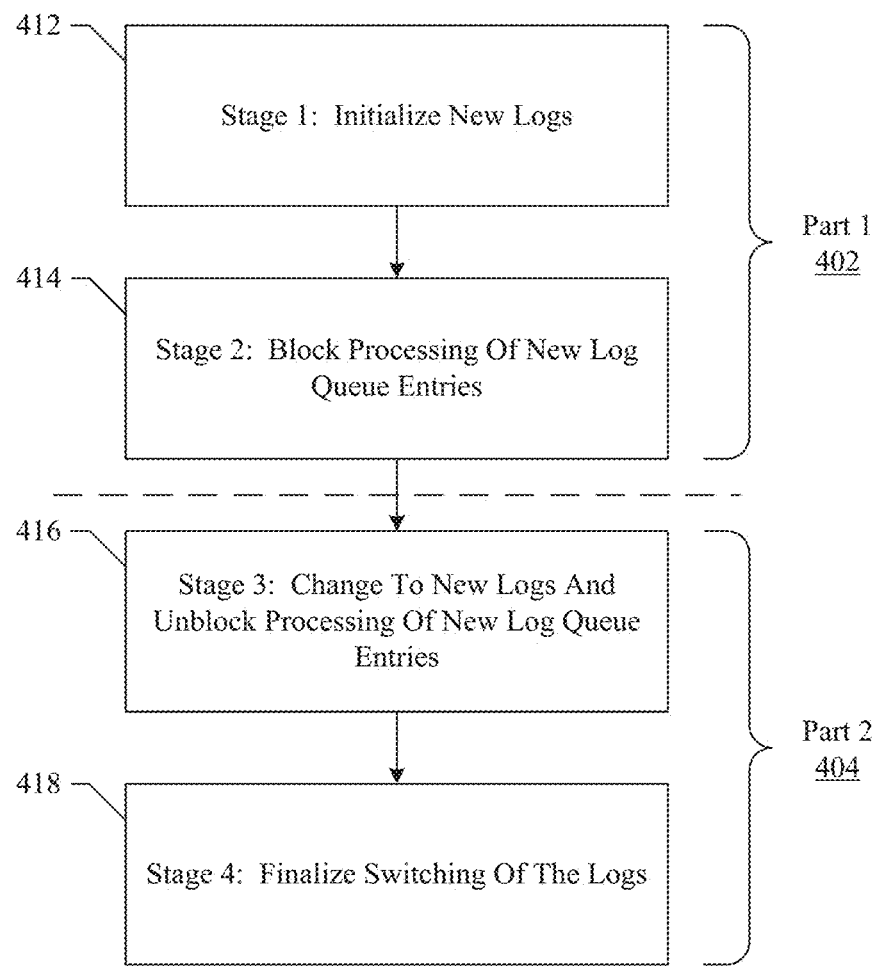
FIG. 4 is a flowchart illustrating an example process for implementing request ordering support when switching virtual disk replication logs in accordance with one or more embodiments.

FIG. 4 is a flowchart illustrating an example process 400 for implementing request ordering support when switching virtual disk replication logs in accordance with one or more embodiments. Process 400 is carried out, for example, by a system 100 of FIG. 1, a system 200 of FIG. 2, and/or an architecture 300 of FIG. 3, and can be implemented in hardware or a combination of hardware with one or both of software and firmware. Process 400 is shown as a set of acts and is not limited to the order shown for performing the operations of the various acts. Process 400 is an example process for implementing request ordering support when switching virtual disk replication logs; additional discussions of implementing request ordering support when switching virtual disk replication logs are included herein with reference to different figures.

Generally, process 400 is performed in two parts. In a first part 402, the new logs are initialized and processing of new log queue entries is blocked. Blocking of new log queue entries refers to entries in the log queue not being processed (e.g., by log request processing module 344 of FIG. 3) and stored in the log file; however, new entries can be added to the log request queue while processing of new log queue entries is blocked. In a second part 404, the new logs are changed to, processing of new log queue entries is unblocked, and the switching of logs is finalized. After the processing of new log queue entries is unblocked, entries in the log queue can be processed (e.g., by log request processing module 344 of FIG. 3) and stored in the new logs.

More specifically, first part 402 includes a first stage 412 in which the new logs are initialized. For each log being switched (e.g., each current log), a new log is initialized. Initializing a new log refers to generating the appropriate data structures, creating the appropriate headers, and so forth for the new log. During first stage 412, log queue entries continue to be processed (e.g., by log request processing module 344 of FIG. 3), and VHD request queue entries continue to be processed (e.g., by VHD request processing module 324 of FIG. 3).

First part 402 also includes a stage 414 in which processing of new log queue entries is blocked. Stage 414 occurs after all of the new logs are initialized (although alternatively may occur after less than all of the new logs are initialized). In stage 414, log queue entries can be added to the log request queue, VHD queue entries can be added to the VHD request queue, and VHD queue entries can be processed (e.g., by VHD request processing module 324 of FIG. 3), but log queue entries are not processed (e.g., by log request processing module 344 of FIG. 3). As discussed above, a storage request is not indicated as being completed until both the VHD queue entry is processed and the corresponding log queue entry is processed. Thus, although VHD queue entries can be processed while processing of new log queue entries is blocked, the requests in such processed VHD queue entries are not indicated as being completed because the corresponding log queue entry has not yet been processed.

Second part 404 includes a stage 416 in which the change to the new logs occurs and processing of new log queue entries is unblocked. For each log being switched, the new log (initialized in stage 412) is changed to in stage 416. Changing to the new log refers to any pointers or other indications of the log to be used being changed to the new log rather than the old log (the log being switched from, and in which log queue requests were stored prior to blocking processing of the new log queue entries in stage 414). For all logs being switched, after the new logs have been changed to, processing of new log queue entries is unblocked. After processing of new log queue entries is unblocked, the operation of the system or architecture resumes as discussed above—VHD queue entries can be added to the VHD request queue and processed (e.g., by VHD request processing module 324 of FIG. 3), and log queue entries can be added to the log request queue and processed (e.g., by log request processing module 344 of FIG. 3).

Second part 404 also includes a stage 418 in which switching of the logs is finalized. Finalizing switching of the logs includes various operations to transfer the old logs elsewhere (e.g., to a recovery device). Finalizing switching of the logs can include, for example, flushing any queue entries of the old log in memory to storage, adding additional information to a header of the old log, transmitting the old log elsewhere, and so forth. Stage 418 typically occurs after processing of the new log queue entries is unblocked, although stages 416 and 418 can alternatively be performed at least in part at the same time (so at least some of the finalization in stage 418 can be performed while the new logs are being changed to and processing of the new log queue entries is being unblocked in stage 416).

Figure 5:
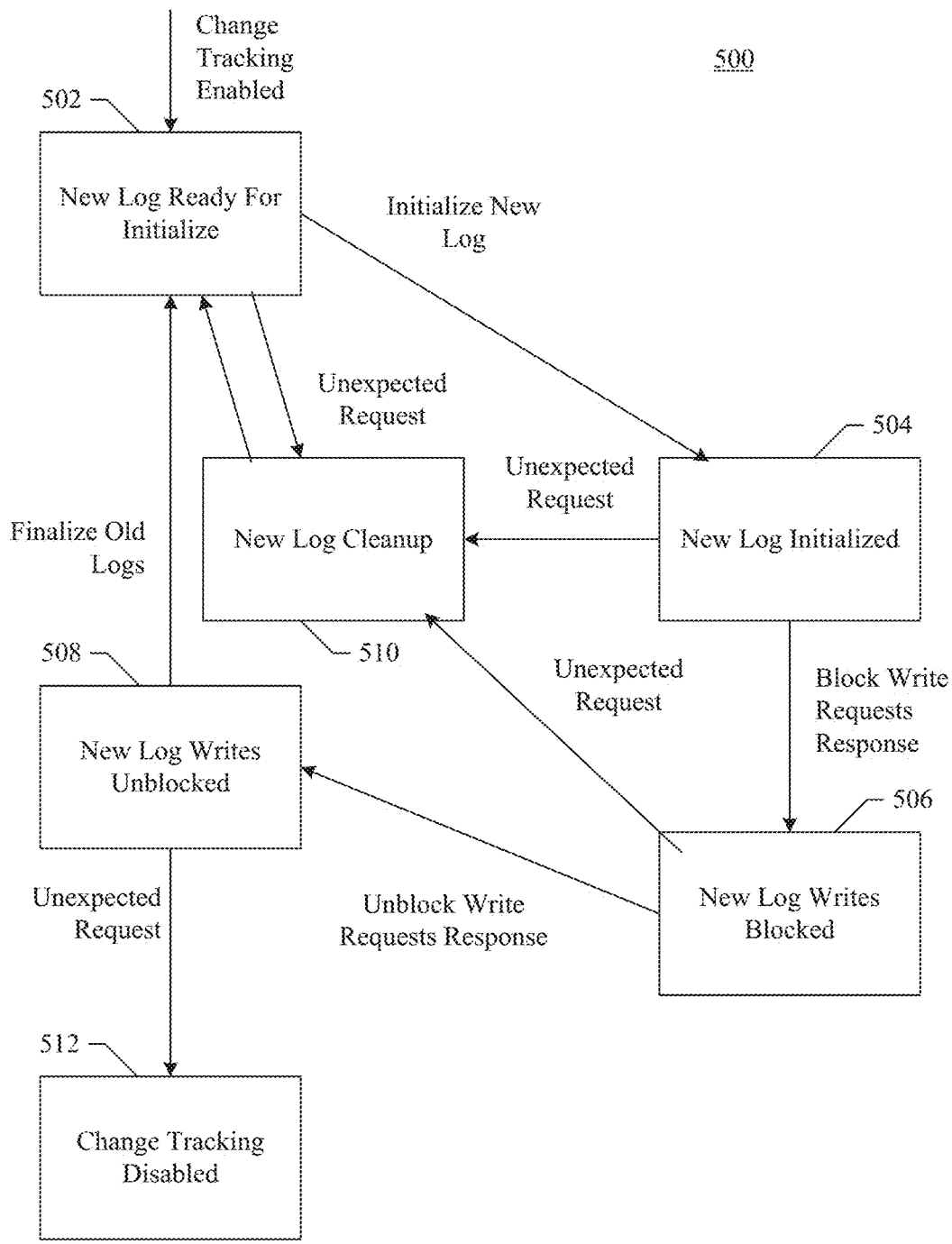
FIG. 5 is a state diagram illustrating example states for implementing request ordering support when switching virtual disk replication logs in accordance with one or more embodiments.

FIG. 5 is a state diagram 500 illustrating example states for implementing request ordering support when switching virtual disk replication logs in accordance with one or more embodiments. State diagram 500 illustrates the different states that a component or module of a VHD parser (e.g., VHD parser 306 of FIG. 3) or replication management module (e.g., module 110 of FIGS. 1 and 2) transitions through. State diagram 500 is discussed with reference to a switch manager implementing state diagram 500. The switch manager may be IOCTL handler 312 of FIG. 3, another component or module of the VHD parser or replication management module, and so forth. Commands or requests to transition to different states are received by the switch manager from a management service (or other module), such as VMMS 340 of FIG. 3, another component or module of a hypervisor, and so forth.

When change tracking is enabled (e.g., the use of logs and log request queues as discussed herein is enabled), the switch manager transitions to a new log ready for initialize state 502. The switch manager waits in state 502 until an initialize new log command is received from the management service. The initialize new log command is received after some interval elapses, an event occurs, etc. as discussed above.

In response to the initialize new log command, the switch manager transitions to a new log initialized state 504. In state 504, the switch manager initializes (or communicates with one or more other modules or components to initialize) the new logs. The first stage 412 of FIG. 4 is implemented by the switch manager while in state 504. After the new logs are initialized, the switch manager notifies (e.g., communicates a response to) the management service that the new logs are initialized.

In response to the notification that the new logs are initialized, the management service sends to the switch manager a block write requests response. In response to the block write requests response, the switch manager transitions to a new log writes blocked state 506. In state 506, the switch manager blocks processing of new log queue entries (e.g., by notifying log request processing module 344 to cease processing of log queue entries), and changes from the old logs to the new logs. This change can be, for example, providing indications (e.g., identifiers of) the new logs to log request processing module 344. The second stage 414 of FIG. 4 as well as part of the third stage 416 (the changing to the new logs) is implemented by the switch manager while in state 506. After processing of new log queue entries is blocked and the change to the new logs is completed, the switch manager notifies (e.g., communicates a response to) the management service that processing of new log queue entries is blocked and the change to the new logs is completed.

In response to the notification that processing of new log queue entries is blocked and the change to the new logs is completed, the management service sends to the switch manager an unblock write requests response. In response to the unblock write requests response, the switch manager transitions to a new log writes unblocked state 508. In state 508, the switch manager unblocks processing of new log queue entries (e.g., by notifying log request processing module 344 to resume processing of log queue entries), and finalizes switching of the logs. Various operations can be performed in finalizing switching of the logs, as discussed above. The fourth stage 418 of FIG. 4 is implemented by the switch manager while in state 508. After processing of new log queue entries is unblocked and the switching of the logs is finalized, the switch manager notifies (e.g., communicates a response to) the management service that processing of new log queue entries is unblocked and the switching of the logs is finalized.

In response to notification that processing of new log queue entries is unblocked and the switching of the logs is finalized, the management service sends to the switch manager a finalize old logs request. In response to the finalize old logs request, the switch manager transitions to new log ready for initialize state 502.

While in state 502, 504, or 506, an unexpected request may be received by the switch manager. An unexpected request received refers to a request other than a request that would allow the switch manager to transition to the next state to continue the log switching (e.g., any request other than an initialize new log request while in state 502, any request other than a block write requests response while in state 504, any request other than an unblock write requests response while in state 506). In response to an unexpected request, the switch manager transitions to new log cleanup state 510. In new log cleanup state 510, the switch manager performs various operations to undo any changes made as part of the log switching. These operation can include, for example, deleting new logs that were created, preventing old logs from being changed from, and so forth. After completing the various operations to undo any changes made as part of the log switching, the switch manager transitions to new log ready for initialize state 502.

Similarly, while in state 508 an unexpected request may be received by the switch manager. An unexpected request refers to a request other than a request that would allow the switch manager to transition to the next state to continue the log switching (e.g., any request other than a finalize old log request). In response to an unexpected request, the switch manager transitions to change tracking disabled state 512. In state 512, change tracking (e.g., the use of logs and log request queues as discussed herein) is disabled). If an unexpected request is received at state 508, the switch manager assumes that a significant problem has occurred and thus, rather than entering new log cleanup state 510, disables change tracking.

In one or more embodiments, situations can arise where the management service malfunctions (e.g., crashes or otherwise ceases normal operation) during log switching. In order to avoid such a malfunction from causing processing of new log queue entries from being blocked indefinitely (e.g., due to an unblock write requests response not being received from the management service because of the malfunction), the switch manager maintains a context for the management service when an initialize new log request is received. This context is identified as part of the initialize new log request, and is typically referred to as a handle that is opened by the management service or other identifier assigned by (or reported to) the operating system. If the management service malfunctions, any such handles or identifiers of the management service are closed by the operating system, and the switch manager is notified of such closures. Thus, if a handle maintained as the context for the management service by the switch manager is closed prior to a finalize old log request being received having that same handle, then the switch manager determines that the management service malfunctioned during the log switching. The switch manager proceeds to take appropriate remedial action (e.g., transition to new log cleanup state 510 and/or change tracking disabled state 512), including unblocking processing of new log queue entries. Thus, a malfunction in the management service will not cause processing of new log queue entries to be blocked indefinitely.

The techniques discussed herein support various different usage scenarios. By blocking processing of new log queue entries but allowing processing of VHD queue entries during log switching, the performance impact due to the log switching is reduced because the VHD queue entries can continue to be processed. The processing of new log queue entries that is blocked can be writing of the log queue entries to memory rather than storage, as discussed above, so when the processing of new log queue entries is unblocked the new log queue entries can be processed quickly relative to the writing of VHD queue entries to storage.

Furthermore, the techniques discussed herein allow the log switching to occur while maintaining request ordering for write order dependent requests. In some situations, storage access requests issued from virtual machines have particular ordering requests. For example, an application of the virtual machine may use a write-ahead-logging (WAL) protocol in which one write request (e.g., a write to a database) to one VHD is not issued until confirmation of completion of another write request (e.g., a write to a log record maintained by the application) to another VHD is received. The techniques discussed herein allow log switching while maintaining such ordering constraints.

For example, assume that two write requests W1 followed by W2 are issued by a virtual machine, and that the order of the write requests is to be maintained (W2 is to be performed after W1). A response indicating completion of W1 is returned after W1 is written to both the VHD file and the log file, and in response to this indication the virtual machine issues W2. By blocking processing of a log queue entry for W1 while log switching, the write of W1 to the log file and thus the indication of completion of W1 is delayed until the log switching is completed. This blocking allows the situation where W1 and W2 are received after one log file is switched but before another log file is switched from resulting in W1 being written to a new log file (and thus not yet transferred to a recovery device) and W2 being written to an old log file (that is transferred to a recovery device as the log switching completes). Such a situation where W2 is transferred to a recovery device but W1 is not transferred would violate the request ordering for W1 and W2 in the recovery system, but is avoided using the techniques discussed herein.

Figure 6:
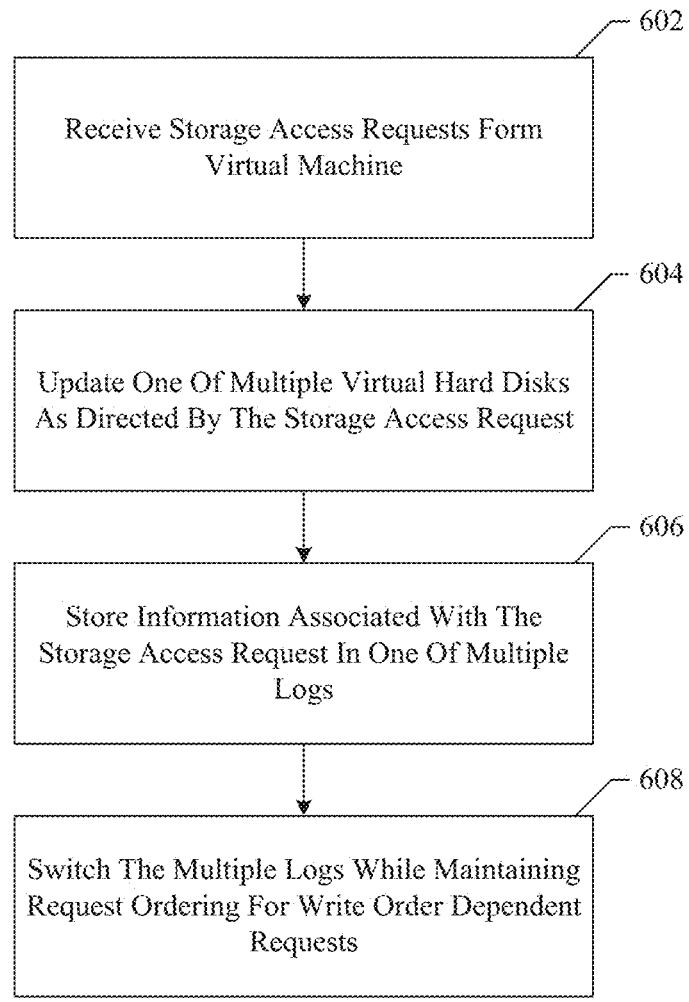
FIG. 6 is a flowchart illustrating an example process for implementing request ordering support when switching virtual disk replication logs in accordance with one or more embodiments.

FIG. 6 is a flowchart illustrating an example process 600 for implementing request ordering support when switching virtual disk replication logs in accordance with one or more embodiments. Process 600 is carried out, for example, by a system 100 of FIG. 1, a system 200 of FIG. 2, and/or an architecture 300 of FIG. 3, and can be implemented in software, firmware, hardware, or combinations thereof. Process 600 is shown as a set of acts and is not limited to the order shown for performing the operations of the various acts. Process 600 is an example process for implementing request ordering support when switching virtual disk replication logs; additional discussions of implementing request ordering support when switching virtual disk replication logs are included herein with reference to different figures.

In process 600, storage access requests are received from a virtual machine (act 602). These storage access requests can be write requests and/or other requests as discussed above.

One of multiple virtual hard disks is updated as directed by the storage access request (act 604). The updating can be, for example, writing data to the virtual hard disk as discussed above. Each storage access request typically indicates one virtual hard disk that is to be updated, but can alternatively indicate multiple virtual hard disks that are to be updated.

Information associated with the storage access request is also stored in one of multiple logs (act 606). Each log (e.g., a log file), also referred to as a replication log, can correspond to one of the virtual hard disks as discussed above.

The multiple logs are switched while maintaining request ordering for write order dependent requests (act 608). This switching can be done in multiple parts and/or multiple stages as discussed above. As part of this switching, the old logs (the logs being switched from) can be transferred to a recovery device, as discussed above. Request ordering is maintained for write order dependent requests at least in part by blocking processing of the information associated with each storage access request, such as by blocking storing log request queue entries in the log, as discussed above.

III. Example Embodiments for Switching Replication Logs Used to Snapshot a Multi-Stream Application on Multiple Hosts As described above, replication logs may be maintained and switched out to be used to update replica storage with changes that were made to primary storage. In some cases, multiple storage instances (e.g., virtual disks, physical disks, memory devices, etc.) may store data that is related. For instance, multiple virtual machines may each operate respective portions of a same distributed application, such that writes made to their respective primary storage have a write order that needs to be maintained when applied to the corresponding replica storage. In other words, an order of writes made by a first virtual machine to its primary storage and an order of writes made by a second virtual machine to its primary storage may need to be maintained with regard to the same writes being made to replica storage, because the first and second virtual machines may communicate with each other, impacting the timing and contents of their respective writes to storage, thereby creating a write order dependency issue.

Figure 7:
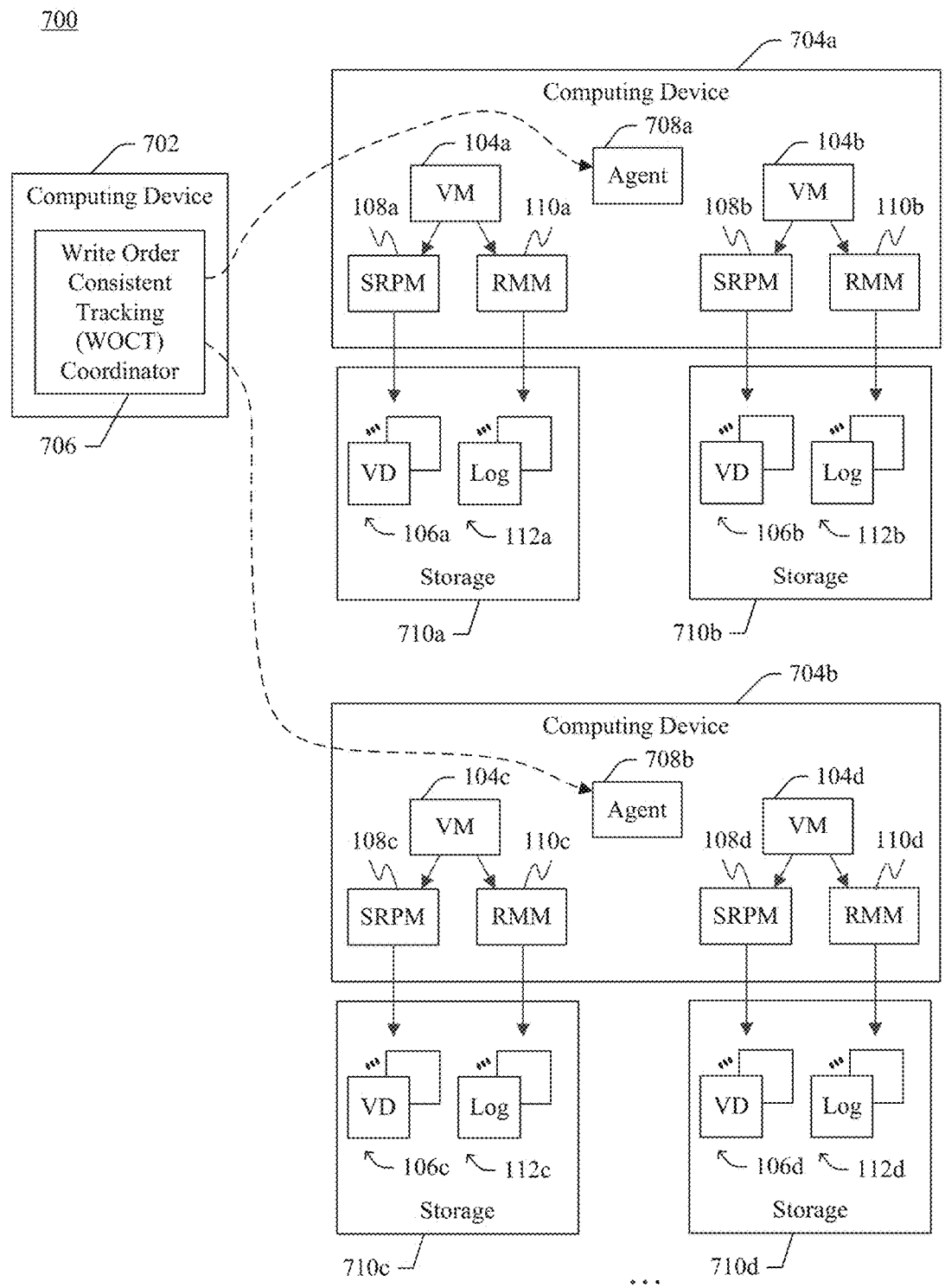
FIG. 7 shows a block diagram of a system that includes multiple virtual disks that store write order dependent data, and that implements the switching of virtual disk replication logs in a manner that maintains write order dependency across virtual disks, according to example embodiments.

Accordingly, the embodiments described in the preceding section may be modified to coordinate the timing of the switching of replication logs, to maintain write order consistency. Such embodiments may be implemented in various ways. For instance, FIG. 7 shows a block diagram of a system 700 that includes multiple virtual disks that store write order dependent data, and that maintains write order dependency across virtual disks, according to example embodiments. For example, system 700 may be included in a computer network, such as a computer cluster (connected computers that work together) that implements distributed applications and incorporates a storage network, or any other computer network that includes multiple computing devices (e.g., computers, servers, etc.) that store interrelated data in storage.

As shown in FIG. 7, system 700 includes a computing device 702, a computing device 704a, and a computing device 704b. Computing device 702 includes a write order consistent tracking (WOCT) coordinator 706. Computing device 704a includes a first virtual machine (VM) 104a, a first storage request processing module (SRPM) 108a, a first replication management module (RMM) 110a, a second VM 104b, a second SRPM 108b, a second RMM 110b, and a first agent 708a. Computing device 704b includes a third VM 104c, a third SRPM 108c, a third RMM 110c, a fourth VM 104*d*, a fourth SRPM 108*d*, a fourth RMM 110*d*, and a second agent 708*b*. These features/elements of system 700 are described as follows.

It is noted that two computing devices that each include two virtual machines are shown in FIG. 7 for purposes of illustration. In other embodiments, further numbers of computing devices may be present, including tens, hundreds, thousands, and greater numbers of computing devices, and other numbers of virtual machines may be present, with each computing device including one or more virtual machines. Furthermore, storage 710*a*, 710*b*, 710*c*, and 710*d* are physical storage devices, and may include memory devices, hard disk drives, and/or other forms of physical storage. Still further, note that although WOCT coordinator 706 is shown in FIG. 7 in a computing device that is separate from computing devices containing virtual machines and agents, in another embodiment, WOCT coordinator 706 may be in a same computing device with an agent and one or more virtual machines.

First VM 104*a*, first SRMP 108*a*, and first RMM 110*a* are respective examples of VM 104, SRPM 108, and RMM 110 described in the preceding section. Similarly, second VM 104*b*, second SRMP 108*b*, and second RMM 110*b*, third VM 104*c*, third SRMP 108*c*, and third RMM 110*c*, and fourth VM 104*d*, fourth SRMP 108*d*, and fourth RMM 110*d* are all respective examples of VM 104, SRPM 108, and RMM 110. Furthermore, in a similar manner as described above, first VM 104*a* stores data in storage 710*a* in one or more VDs 106*a* through SRPM 108*a*, and one or more logs 112*a* corresponding to VDs 106*a* are generated by RMM 110*a*, and stored in storage 710*a*, to store storage access requests from first VM 104*a* for replication purposes. Similarly, second VM 104*b* uses second SRMP 108*b* and second RMM 110*b* to store data in VD 106*b* in storage 710*b*, and generate logs 112*b* that are stored in storage 710*b*, third VM 104*c* uses third SRMP 108*c* and third RMM 110*c* to store data in VD 106*c* in storage 710*c*, and generate logs 112*c* that are stored in storage 710*c*, and fourth VM 104*d* uses fourth SRMP 108*d* and fourth RMM 110*d* to store data in VD 106*d* in storage 710*c*, and generate logs 112*c* that are stored in storage 710*d*. Because these features of FIG. 7 are described elsewhere herein (e.g., the preceding section), this description is not provided again in full in this section for purposes of brevity.

In embodiments, WOCT coordinator 706 in computing device 702 is configured to coordinate the switching of replication logs across computing devices 704*a*, 704*b*, etc., to maintain write order consistency. For instance, WOCT coordinator 706 may communicate with agents at computing devices that contain virtual machines, such as agents 708*a* and 708*b*. WOCT coordinator 706 may instruct the agents to initiate log switching for all of the virtual machines at their respective computing devices, and to provide the resulting old logs (the logs switched out) to WOCT coordinator 706 or elsewhere to be applied to replica storage.

Figure 8:
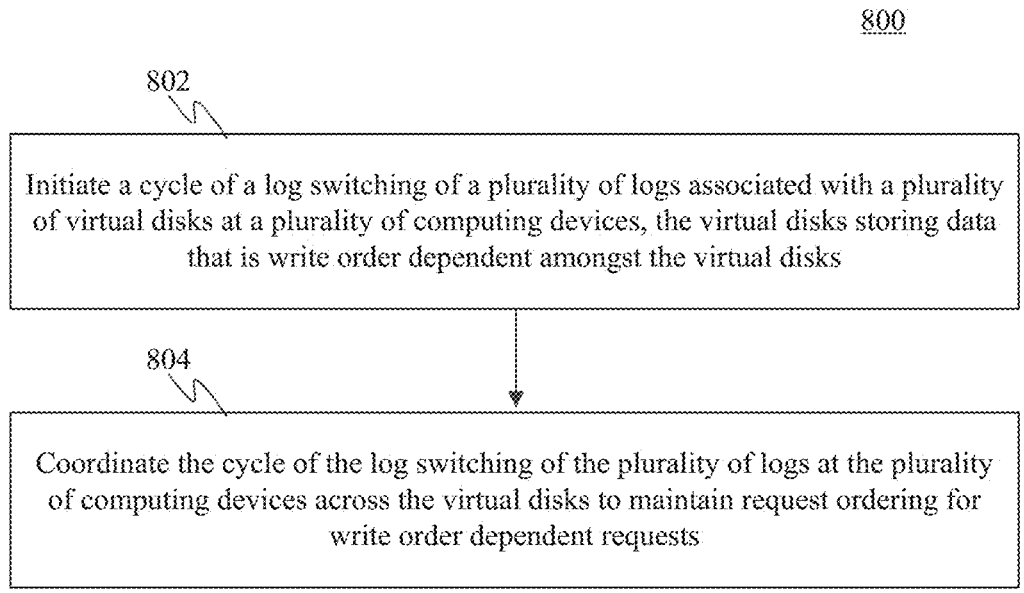
FIG. 8 shows a flowchart providing a process for the switching of virtual disk replication logs in a manner that maintains write order dependency across virtual disks, according to an example embodiment.
Figure 9:
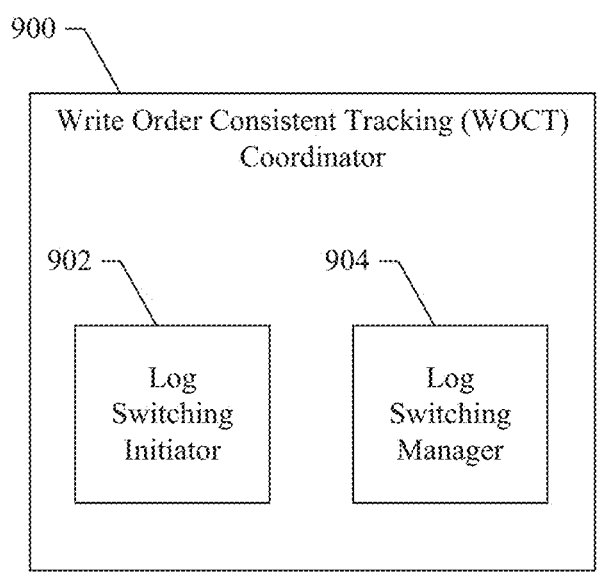
FIG. 9 shows a block diagram of a write order consistent tracking coordinator, according to an example embodiment.

For example, in an embodiment, WOCT coordinator 706 may operate according to FIG. 8. FIG. 8 shows a flowchart 800 providing a process for the switching of virtual disk replication logs in a manner that maintains write order dependency across virtual disks, according to an example embodiment. Flowchart 800 is described as follows with respect to FIG. 7 and FIG. 9. FIG. 9 shows a block diagram of a WOCT coordinator 900, according to an example embodiment. WOCT coordinator 900 is an example of WOCT coordinator 706 of FIG. 7. Further structural and operational embodiments will be apparent to persons skilled in the relevant art(s) based on the following description.

Flowchart 800 begins with step 802. In step 802, a cycle of a log switching of a plurality of logs associated with a plurality of virtual disks at a plurality of computing devices is initiated, the virtual disks storing data that is write order dependent amongst the virtual disks. For example, in an embodiment, log switching initiator 902 of WOCT coordinator 900 (FIG. 9) may initiate a cycle of log switching for instances of storage at computing devices. For example, in an embodiment, log switching 902 may transmit an instruction to the agents at the computing devices through a network (e.g., a local area network, a wide area network, a combination of networks such as the Internet, a storage area network, etc.), and/or may initiate the log switching cycle in another way. Further example embodiments for initiating a cycle of log switching according to step 802 are described below.

In step 804, the cycle of the log switching of the plurality of logs at the plurality of computing devices is coordinated across the virtual disks to maintain request ordering for write order dependent requests. In an embodiment, log switching manager 904 of WOCT coordinator 900 (FIG. 9) may be configured to coordinate the cycle of log switching initiated by log switching initiator 902. Log switching manager 904 may configured to coordinate one or more stages of the cycle of log switching by communicating with the agents, such that each stage is performed and confirmed by each agent before enabling the next stage to be performed. For instance, in an embodiment, log switching 902 may transmit instructions or control codes, may use exclusive locks, and/or may use other techniques to coordinate the log switching cycle. Further example embodiments for coordinating a cycle of log switching according to step 804 are described below.

Figure 10:
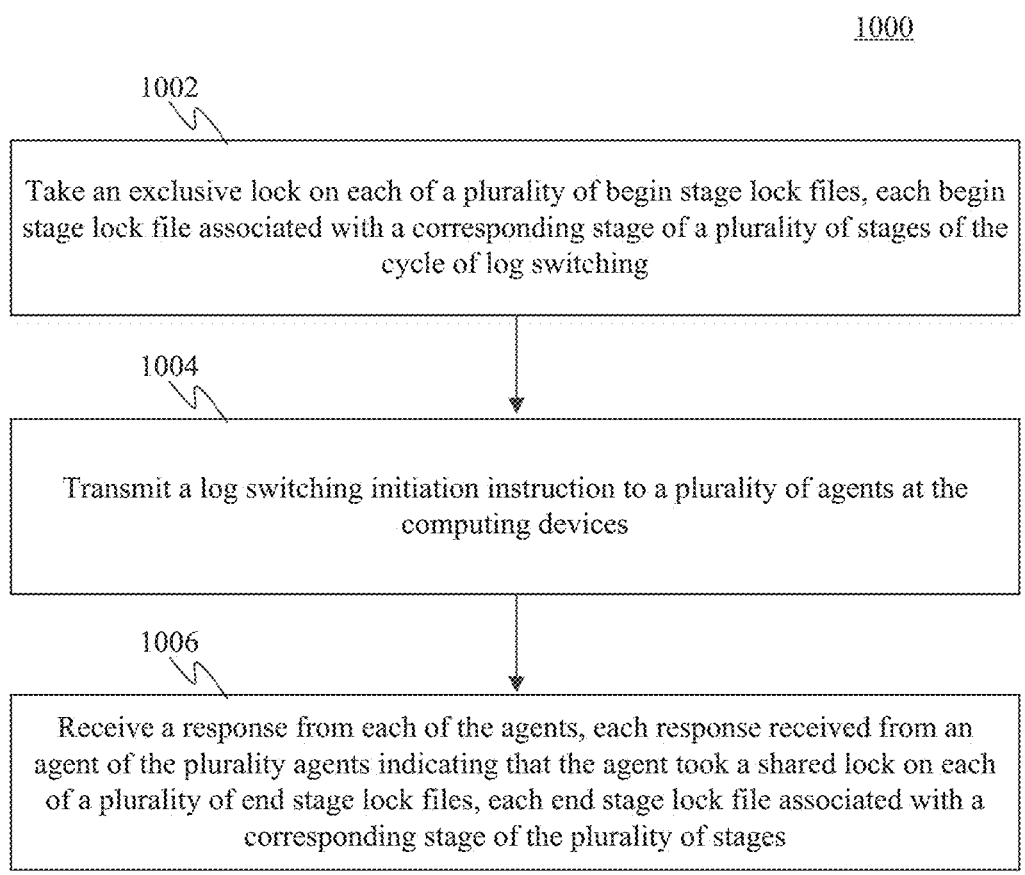
FIG. 10 shows a flowchart providing a process for initiating log switching, according to an example embodiment.
Figure 11:
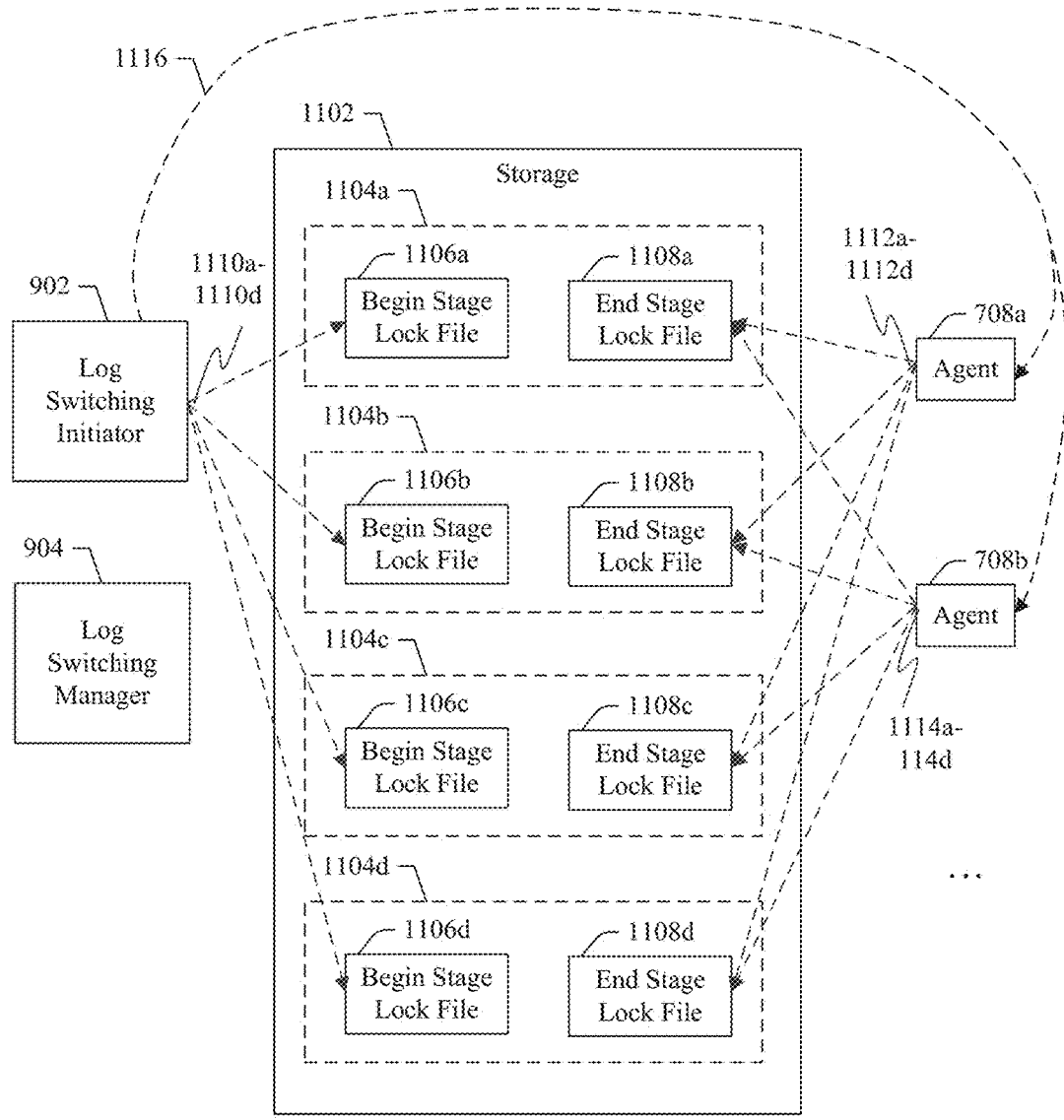
FIGS. 11 and 12 show block diagrams of a system of using lock files to coordinate log switching, according to example embodiments.
Figure 12:
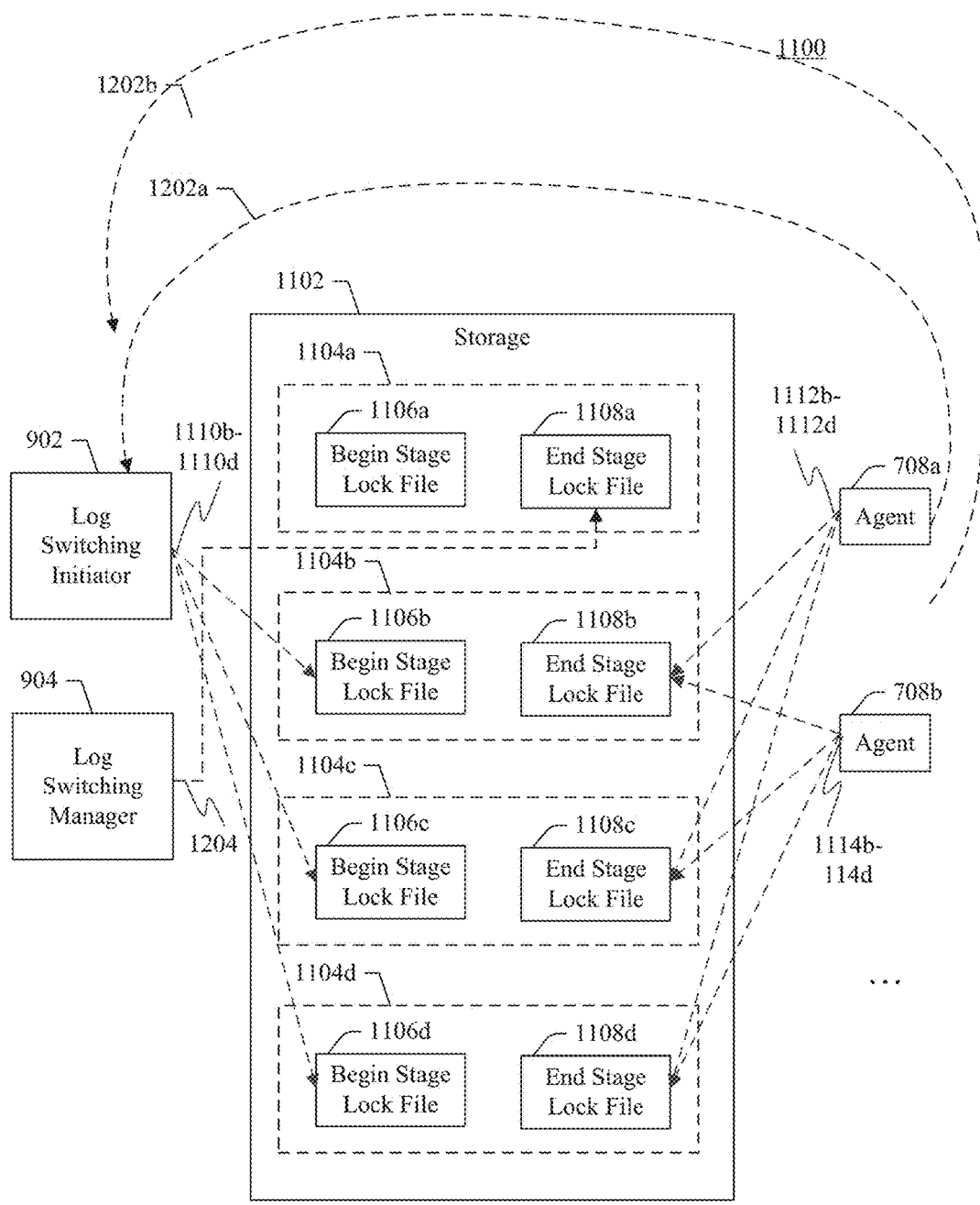

Accordingly, in embodiments, log switching initiator 902 of WOCT coordinator 900 may initiate a cycle of log switching (step 802) in various ways. For instance, FIG. 10 shows a flowchart 1000 providing a process for initiating log switching, according to an example embodiment. Log switching initiator 902 may operate according to flowchart 1000 in an embodiment. Flowchart 1000 is described as follows with respect to FIG. 7, FIG. 9, and FIGS. 11 and 12. FIGS. 11 and 12 show block diagrams of a system 1100 of using lock files to coordinate log switching, according to example embodiments. FIGS. 11 and 12 each show log switching initiator 902, log switching manager 904, agent 708*a*, agent 708*b*, and storage 1102 that is accessible by each of log switching initiator 902, log switching manager 904, agent 708*a*, agent 708*b*. Storage 1102 includes first-fourth begin stage lock files 1106*a*-1106*d* and first-fourth end stage lock files 1108*a*-1108*d*. Further structural and operational embodiments will be apparent to persons skilled in the relevant art(s) based on the following description.

Flowchart 1000 begins with step 1002. In step 1002, an exclusive lock is taken on each of a plurality of begin stage lock files, each begin stage lock file associated with a corresponding stage of a plurality of stages of the cycle of log switching. In embodiments, a cycle of log switching may be performed in any number of stages. For example, log switching may be performed for a virtual machine according to FIG. 4, where four stages 412, 414, 416, and 418 are used in a cycle. In other embodiments, other numbers of stages may be used. A variety of mechanisms may be used to control/coordinate switching from one stage to another. For example, in an embodiment, one or more lock files may be used at each stage to coordinate stages of log switching. A lock file is a file whose content may be irrelevant (other than an identifier of a holder of the lock in the file, etc.), but is used to signal that a resource is locked. In embodiments, whether a lock file is locked or not may be an indicator of whether a stage may begin, whether a coordinator or process has performed its functions in a stage, or whether some other task related to a stage has been or can be performed. In one example embodiment, each stage may have a corresponding begin stage lock file and an end stage lock file, as further described below.

For instance, as shown in FIG. 11, begin stage lock file 1106a and end stage lock file 1108a are first stage lock files 1104a that may be associated with a first stage (e.g., first stage 412). Likewise, begin stage lock file 1106b and end stage lock file 1108b are second stage lock files 1104b that may be associated with a second stage (e.g., second stage 414), begin stage lock file 1106c and end stage lock file 1108c are third stage lock files 1104c that may be associated with a third stage (e.g., third stage 416), and begin stage lock file 1106d and end stage lock file 1108d are fourth stage lock files 1104d that may be associated with a fourth stage (e.g., fourth stage 418).

In the example of FIG. 11, at the outset, begin stage lock files 1106a-1106d and end stage lock files 1108a-1108d may have no locks placed on them by agents or coordinators. In an embodiment, log switching initiator 902 may verify that no locks are taken on begin stage lock files 1106a-1106d and end stage lock files 1108a-1108d (e.g., no lock entries in the lock files by agents, etc.). Log switching initiator 902 takes an exclusive lock on each of begin stage lock files 1106a-1106d, as represented by exclusive locks 1110a-1110d (e.g., writes an exclusive lock entry to the lock files, etc.). In this manner, agents 708a, 708b, and any other agents that are present, are prevented from taking a lock on begin stage lock files 1106a-1106d, and are thereby indicated to not perform their functions for any stage.

Referring back to FIG. 10, in step 1004, a log switching initiation instruction is transmitted to a plurality of agents at the computing devices. For example, as shown in FIG. 11, log switching initiator 902 may transmit a log switching initiation instruction 1116. Log switching initiation instruction 1116 may be transmitted through a network as described elsewhere herein to be received by agents 708a, 708b, etc. Log switching initiation instruction 1116 indicates to agents 708a, 708b, etc. that a cycle of log switching is to commence, and indicates that agents 708a, 708b, etc. should prepare for a cycle of log switching, and provide a response to indicate readiness for the log switching.

Accordingly, upon receipt of log switching initiation instruction 1116, agents 708a, 708b, etc. each prepare for log switching. The agents may perform one or more preparatory processes for log switching. For instance, as shown in FIG. 11, each agent 708a, 708b, etc., may take a shared lock on each of end stage lock files 1108a-1108d, as represented by shared locks 1112a-1112d taken by agent 706a (e.g., writes a shared lock entry to the lock files, etc.), shared locks 1114a-1114d taken by agent 706b, etc.

In step 1006, a response is received from each of the agents, each response received from an agent of the plurality agents indicating that the agent took a shared lock on each of a plurality of end stage lock files, each end stage lock file associated with a corresponding stage of the plurality of stages. In an embodiment, as shown in FIG. 12, after taking the shared locks, agents 708a, 708b, etc. may transmit a corresponding readiness response 1202a, 1202b, etc. Readiness responses 1202a, 1202b, etc., may be transmitted through a network as described elsewhere herein to be received by log switching indicator 902. In this manner, agents 708a, 708b, and any other agents that are present, indicate their readiness to log switching coordinator 902 to perform their functions for each stage.

It is noted that if an agent is unable to take all of the shared locks on the end stage lock files, or if there is another problem with the agent, the agent may not transmit its readiness response and/or the readiness response may not be received by log switching coordinator 902. Log switching coordinator 902 may be configured in various ways to handle the situation where a readiness response is not received from one or more agents. For instance, log switching coordinator 902 may be configured to abort the cycle of log switching, and may transmit an abort command to the agents. In another embodiment, log switching coordinator 902 may decide to continue the cycle of log switching without the agent. A result of this may be that the particular non-responsive agent does not cause the switching of logs for the virtual machines at its computing device. This may be acceptable where it is presumed that the agent can catch up during a subsequent cycle of log switching, and/or based on any other suitable consideration.

Figure 13:
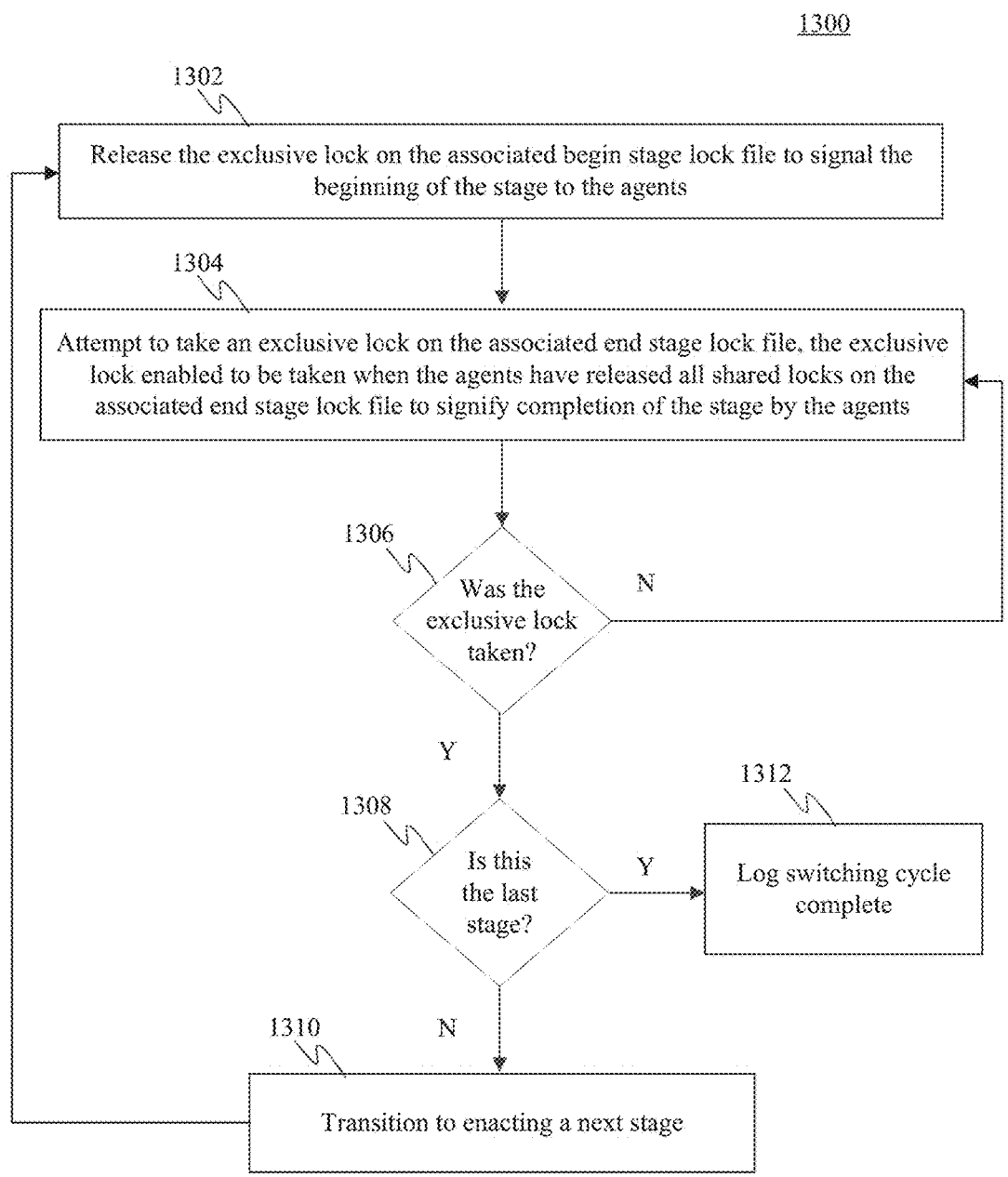
FIG. 13 shows a flowchart providing a process for coordinating a stage of log switching, according to an example embodiment.

Accordingly, in the manner of flowchart 1000, log switching initiator 902 of WOCT coordinator 900 may initiate a cycle of log switching (step 802). As described above, log switching manager 904 of WOCT coordinator 900 may be configured to coordinate a cycle of log switching (step 804 of FIG. 8). For instance, FIG. 13 shows a flowchart 1300 providing a process for coordinating a stage of log switching, according to an example embodiment. Log switching manager 904 may operate according to flowchart 1300 in an embodiment. Flowchart 1300 is described as follows with respect to FIG. 9 and FIGS. 11 and 12. Further structural and operational embodiments will be apparent to persons skilled in the relevant art(s) based on the following description.

Flowchart 1300 begins with step 1302. In step 1302, the exclusive lock is released on the associated begin stage lock file to signal the beginning of the stage to the agents. In an embodiment, to signal the beginning of a stage to agents 706a, 70b, log switching manager 904 may release the exclusive lock on the stage. For instance, with respect to FIG. 11, the first stage (e.g., first stage 412 of FIG. 4) may be desired to be performed. In such case, log switching manager 904 may release exclusive lock 1110a on begin stage lock file 1106a. Log switching manager 904 may release the exclusive lock directly (e.g., by removing an exclusive lock entry from the begin stage lock file), or may instruct log switching initiator 902 to release the lock.

Once the exclusive lock is released on the begin stage lock file of a stage, this signals to the agents that the functions of the stage may be performed. For instance, after initiation of the cycle of log switching (e.g., step 802 in FIG. 8), agents 708a, 708b, etc., may check begin stage lock files 1106a-1106d periodically to determine whether each stage has begun. When an agent determines that an exclusive lock is not present on a begin stage lock file, this indicates to the agent that the stage has begun. In such case, the agent may have the functions of the stage performed with respect to the log files associated with its virtual machines.

For example, if the current stage is the first stage, as shown in FIG. 12, log switching manager 904 may cause exclusive lock 1110a (of FIG. 11) on begin stage lock file 1106a to be released, and thus not shown in FIG. 12. Agents 706a, 706b, etc. may determine that exclusive lock 1110a has been released, and thus the first stage may be performed. For instance, with respect to FIG. 4, first stage 412 may be performed, where new logs may be initialized as described above. If the stage is the second stage, the agents may determine that exclusive lock 1110b on begin stage lock file 1106*b* has been released, and that the second stage (e.g., second stage 414 of FIG. 4) may be performed. If the stage is the third stage, the agents may determine that exclusive lock 1110*c* on begin stage lock file 1106*c* has been released, and that the third stage (e.g., third stage 416 of FIG. 4) may be performed. If the stage is the fourth stage, the agents may determine that exclusive lock 1110*d* on begin stage lock file 1106*d* has been released, and that the fourth stage (e.g., fourth stage 418 of FIG. 4) may be performed.

From step 1302 of FIG. 13, operation proceeds to step 1304.

In step 1304, an exclusive lock is attempted to be taken on the associated end stage lock file, the exclusive lock enabled to be taken when the agents have released all shared locks on the associated end stage lock file to signify completion of the stage by the agents. In an embodiment, when each agent has confirmed that a current stage has been completed for the virtual machines at its computing device, the agent releases its shared lock on the end stage lock file for that stage (e.g., removes the corresponding entry from the lock file). When all of the agents have released their shared locks on the end stage lock file for that stage (e.g., all shared lock entries removed from the end stage lock file), log switching manager 904 is enabled to take an exclusive lock on the end stage lock file, indicating the stage as completed.

For example, with reference to FIG. 12, log switching manager 904 attempts to take locks on end stage lock file 1108*a*. If any shared locks are maintained on end stage lock file 1108*a*, log switching manager 904 cannot take an exclusive lock on end stage lock file 1108*a*. As shown in FIG. 12, agent 708*a* has completed the first stage, and thus releases shared lock 1112*a* (shown in FIG. 11) on end stage lock file 1108*a*. Agent 708*b* has not yet completed the first stage, so shared lock 1112*b* is still present on end stage lock file 1108*a*, and log switching manager 904 still cannot take exclusive lock. When shared lock 1112*b* is released by agent 708*b*, and any further shared locks on end stage lock file 1108*a* are released by any further agents, log switching manager 904 is enabled to take an exclusive lock on end stage lock file 1108*a*, shown as exclusive lock 1204.

From step 1304 of FIG. 13, operation proceeds to step 1306.

In step 1306, whether the exclusive lock of step 1304 was taken is determined. If the exclusive lock is able to be taken on the end stage lock file for the stage by log switching manager 904, the agents have signaled that they have completed the functions of the stage, and operation proceeds to step 1308. If the exclusive lock is not able to be taken on the end stage lock file for the stage by log switching manager 904, one or more of the agents have not completed the functions of the stage, and operation proceeds back to step 1304.

In step 1308, whether the current stage is the last stage of the log switching cycle is determined. If the current stage is the last stage of the log switching cycle (e.g., fourth stage 418 of the four stage process 400 of FIG. 4), operation proceeds to step 1310. If the current stage is not the last stage of the log switching cycle, operation proceeds to step 1312.

In step 1310, the next stage is transitioned to. When the current stage is completed, operation proceeds to step 1302, where log switching manager 904 initiates the next stage of the log switching cycle.

In step 1312, the log switching cycle is complete. When all stages of the log switching cycle have been performed, the log switching cycle is complete.

Accordingly, in the manner of flowchart 1300, log switching manager 904 of WOCT coordinator 900 may coordinate a cycle of log switching (step 804 of FIG. 8). As described above, log switching manager 904 of WOCT coordinator 900 may be configured to coordinate a cycle of log switching in other ways, such as through the use of control codes and/or other types of messages than control codes. For instance, FIG. 14 shows a step 1402 for using control codes to coordinate log switching, according to an example embodiment. Step 1402 is an example embodiment for step 804 of FIG. 8. In step 1402, control codes are transmitted to a plurality of agents at the computing devices to enact the plurality of stages. A WOCT coordinator may be configured to use control codes to coordinate stages of a log switching process in any manner.

For instance, with reference to FIG. 7, system 700 may be a cluster computing system or network. A cluster computing network includes a set of loosely connected or tightly connected nodes/computers (e.g., computing devices 702, 704*a*, 704*b*, etc.) that work together so that in many respects they can be viewed as a single system. The components of a cluster are usually connected to each other through fast local area networks ("LAN"), which may be referred to as a dedicated cluster communication network, with each node running its own instance of an operating system. Computer clusters are enablers for high performance distributed computing. "High-availability clusters" (also known as failover clusters, or HA clusters) are a type of computer cluster that includes redundant nodes, which are then used to provide service when system components fail. In a computer cluster, a heartbeat network may be present that is a private network shared by the cluster nodes, and used so that the cluster nodes can monitor the status of each other, and to communicate with each other (e.g., using control codes or "cluster codes"). According to the heartbeat mechanism, every node sends a message in a given interval (a "heartbeat"), referred to as a delta, to confirm that the node is alive. A receiver node called a "sink" maintains an ordered list of the messages. Once a message with a timestamp later than a marked time is received from every node, the system determines that all of the nodes are functioning.

Accordingly, in an embodiment, WOCT coordinator 706 may be configured to communicate with agents 708*a*, 708*b*, etc. using control codes over a heartbeat network. In other words, as shown in FIG. 11, log switching initiation instruction 1116 may be transmitted by log switching initiator 902 to agents 706*a*, 706*b*, etc. over a heartbeat network of a cluster network. Furthermore, responses 1202*a*, 1202*b*, etc. may be transmitted by agents 706*a*, 706*b*, etc. to log switching initiator 902 over the heartbeat network. Still further, log switching initiator 902 and agents 706*a*, 706*b*, etc. may communicate with each other over the heartbeat network using control codes and/or messages to coordinate performance of the stages of a cycle of log switching, rather than using lock files (as in FIGS. 10-12, and related text herein).

For example, FIG. 15 shows a flowchart 1500 providing a process for using control codes to coordinate a stage of log switching, according to an example embodiment. In an embodiment, log switching manager 904 (FIG. 9) may perform flowchart 1500 (e.g., to perform step 1402 of FIG. 14). Flowchart 1500 is described as follows with respect to FIG. 7. Further structural and operational embodiments will be apparent to persons skilled in the relevant art(s) based on the following description.

Flowchart 1500 starts with step 1502. In step 1502, a time period for performing the log switching is initiated. Step 1502 (and step 1508) is optional. In an embodiment, log switching manager 904 may maintain a predetermined time period that is a length of time by which a full cycle of log switching is to be performed, or else the cycle is aborted (no log switching occurs). The time period may be preconfigured to have any length of time suitable for a particular network configuration (e.g., 100 microseconds, etc.). Operation proceeds from step 1502 to step 1504.

In step 1504, a control code is transmitted to the plurality of agents. In step 1504, a control code may be transmitted by log switching manager 904 to agents 708a, 708b, etc. over the cluster network. The control code is recognized by the agents to signify a start to a stage. In one embodiment, a same control code is used to initiate all stages. In another embodiment, each stage may have its own control code configured to initiate the stage at the agents.

For instance, the first stage (e.g., first stage 412 of FIG. 4) may be desired to be performed. In such case, log switching manager 904 may transmit a control code to agents 708a, 708b, etc. When the control code is received by the agents, this signals to the agents that the functions of the first stage may be performed. In such case, the agents may have the functions of the first stage performed with respect to the log files associated with its virtual machines. In a similar manner, the switching manager 904 may transmit a control code to agents 708a, 708b, etc. to signal to the agents that the functions of the second stage, third stage, fourth stage, etc. may be performed.

In step 1506, a response to the transmitted control code is awaited from each of the plurality of agents. In an embodiment, log switching manager 904 may await a response to the transmitted control code from each of agents 708a, 708b, etc. Agents 708a, 708b, etc. may transmits the responses in any form (e.g., as response control codes, etc.) to log switching manager 904 through the cluster network. When responses from all agents are received by log switching manager 904 indicating success in performing the stage at the various computing devices, operation proceeds to step 1506. If a response is not received from an agent, this may indicate a failure to perform a stage at the corresponding computing device, or may indicate some other failure (e.g., a communication failure, agent going down, etc.). In such case, operation may optionally proceed to step 1510 where the log switching cycle is aborted, or operation may proceed to step 1506, with logs at computing devices of any non-responsive agents (and/or agents responding with stage failures) potentially not being switched during the current log switching cycle.

In step 1508, whether the time period has expired before all responses to the transmitted control codes are received is determined. As indicated in step 1502 above, step 1508 is optional. In an embodiment, during performance of a log switching cycle, log switching manager 904 may periodically check whether the time period initiated in step 1502 has expired. If the time period has expired, operation proceeds to step 1510. If the time period has not expired, operation proceeds to step 1512.

In step 1510, the log switching is aborted if at least one of the agents does not respond with the awaited response within a predetermined time period. In an embodiment, step 1510 may be performed by log switching manager 904, to end the log switching cycle without any logs being switched. Operation of flowchart 1510 completes after step 1510.

In step 1512, whether the current stage is the last stage of the log switching cycle is determined. If the current stage is the last stage of the log switching cycle (e.g., fourth stage 418 of the four stage process 400 of FIG. 4), operation proceeds to step 1516. If the current stage is not the last stage of the log switching cycle, operation proceeds to step 1514.

In step 1514, a next stage is transitioned to for enactment. When the current stage is completed, operation proceeds to step 1504, where log switching manager 904 initiates the next stage of the log switching cycle.

In step 1516, the log switching cycle is complete. When all stages of the log switching cycle have been performed (within the optional time period), the log switching cycle is complete.

It is noted that although lock files and control codes are presented as example techniques for coordinating log switching, other techniques for coordinating log switching may become apparent to persons skilled in the relevant art(s) from the teachings herein, which are encompassed as embodiments. Furthermore, embodiments may be combined in any manner. For instance, in an embodiment, a WOCT coordinator may implement both the lock file technique (e.g., FIGS. 10-13) and the control code technique (e.g., FIGS. 14 and 15) simultaneously in a computer network. In such an embodiment, for each stage, the approach that works more quickly (e.g., an indication that a stage is complete is provided more quickly) can be used to move to the next stage more quickly. For instance, in some situations, the lock file approach may finish a stage (e.g., agents releasing shared locks on the end stage lock file) faster than a control code approach is able to finish the stage (e.g., agents responding to a received control code). In other situations, the control code approach may be able to finish the stage faster than the lock file approach is able to finish a stage.

Accordingly, according to embodiments, log switching is enhanced to achieve write order preservation across multiple servers by introducing synchronization between change tracking mechanisms in different servers. To have minimal impact on servers, the synchronization is achieved without pausing VM operation, and without having to perform IO during synchronization, and is finished within relatively short amounts of time. The synchronization is performed in a manner that is not continuous, but is performed at particular time intervals as specified by a desired product replication frequency. In an embodiment, the synchronization success rate may only be limited by the speed of communication between server and specified timeouts by the product. Accordingly, a generic framework is defined to enable multiple communication channels between servers to achieve synchronization as quickly as possible.

IV. Example Embodiments for Replication of a Multi-Stream Application Based on Replication Logs As described above, embodiments are provided for replication of a multi-stream application (e.g., an application that generates multiple separate streams of data, which may be stored separately). According to embodiments, the stored data of an application may be replicated and maintained in sync with the primary stored data, by applying the switched out logs generated in the prior section to replica storage at particular times. Such embodiments may be implemented in various ways.

Figure 16:
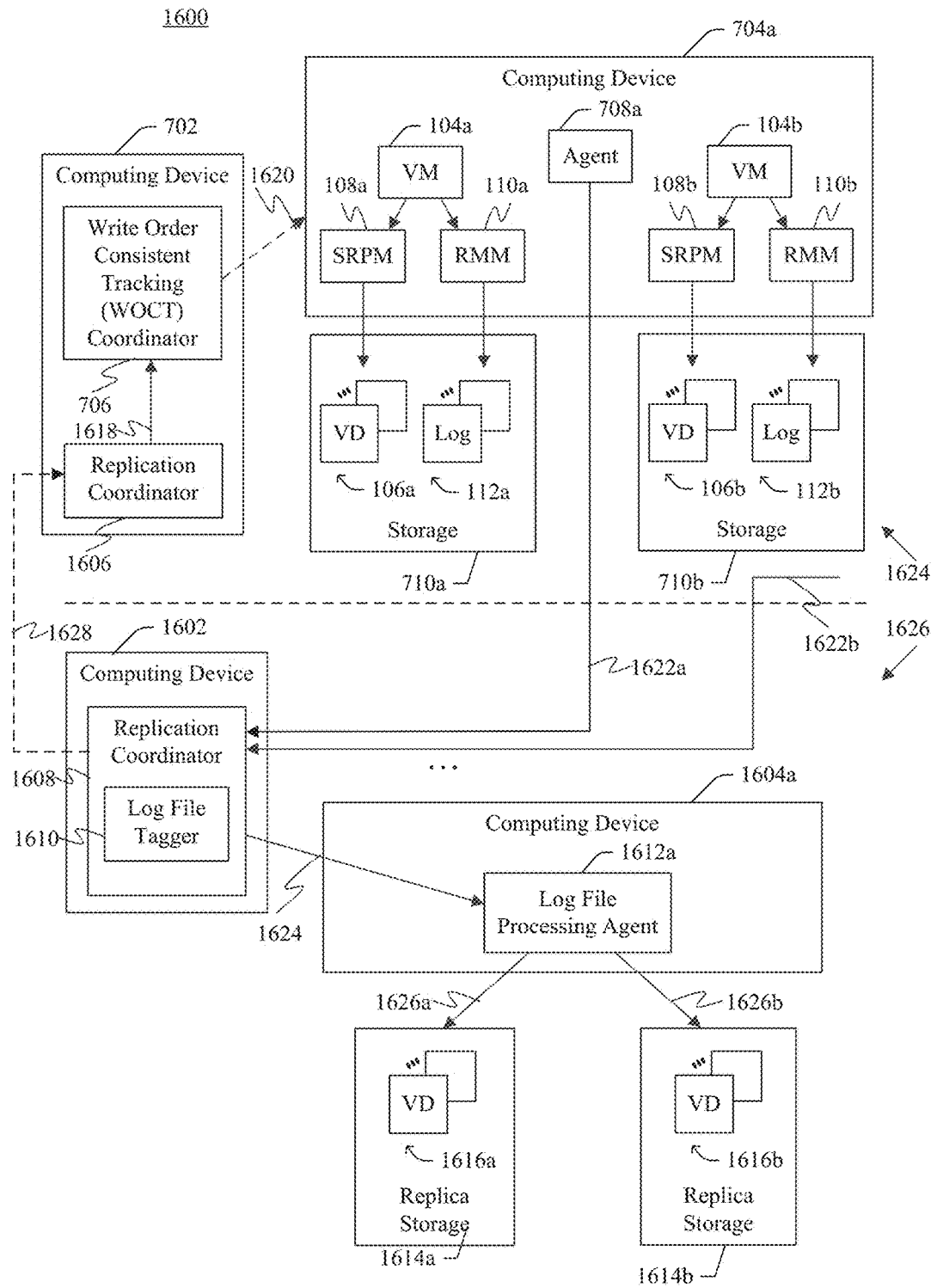
FIG. 16 shows a block diagram of a system that includes replication coordinators to coordinate log switching and the application of virtual disk replication logs to replica storage, according to example embodiments.

For example, FIG. 16 shows a block diagram of a system 1600 that includes replication coordinators to coordinate log switching and the application of virtual disk replication logs to replica storage, according to example embodiments. As shown in FIG. 16, system 1600 is similar to FIG. 7, including computing device 702 and computing device 704a (computing device 704b, and any further computing devices, are not shown in FIG. 16 for ease of illustration). Computing device 702 includes WOCT coordinator 706 as in FIG. 7, and computing device 704a is configured as shown in FIG. 7. In an embodiment, WOCT coordinator 706 may coordinate switching of logs at computing device 704a by communicating with agent 708a, and switching of logs at further computing devices by communicating with corresponding agents, as described elsewhere herein. Furthermore, in FIG. 16, system 1600 includes a computing device 1602, a computing device 1604a (and optional further computing devices), a replica storage 1614a, and a replica storage 1614b. Still further, computing device 702 includes a first replication coordinator 1606, computing device 1604a includes a log file processing agent 1612a, replica storage 1614a includes at least one virtual disk 1616a, and replica storage 1614b includes at least one virtual disk 1616b.

In FIG. 16, computing device 702, computing device 704a, storage 710a, and storage 710b are considered primary side or primary-site components as indicated by primary side 1624, and computing device 1602, computing device 1604a, replica storage 1614a, and replica storage 1614b are considered secondary side, secondary-site, or replica side components as indicated by replica side 1626. This is because replica storage 1614a is replica storage for storage 710a, with virtual disk(s) 1616a being a replica of virtual disk(s) 106a, and replica storage 1614b is replica storage for storage 710b, with virtual disk(s) 1616b being a replica of virtual disk(s) 106b. Each storage instance associated with a virtual machine at a computing device on primary side 1624 has a counterpart replica storage on replica side 1626. Furthermore, computing device 1604a (e.g., a server, etc.) is the replica side counterpart to computer device 704a.

In an embodiment, first and second replication coordinators 1606 and 1608 work together to replicate data on primary side 1624 to replica side 1616 using the replication logs generated according to the techniques described elsewhere herein. Accordingly, multiple storage instances (e.g., virtual disks) that store related data may be replicated to replica side 1616 simultaneously, which assists in maintaining write order consistency.

Figure 17:
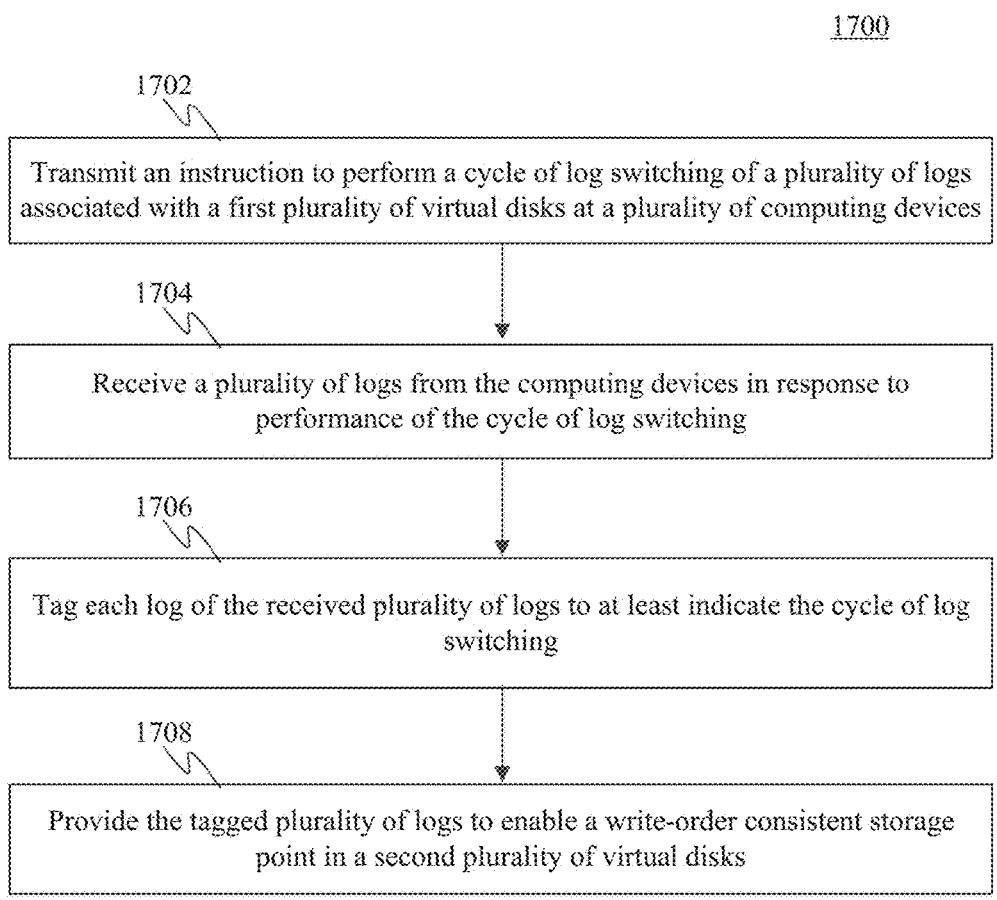
FIG. 17 shows a flowchart providing a process for coordinating log switching and the application of virtual disk replication logs to replica storage, according to an example embodiment.

First and second replication coordinators 1606 and 1608 may operate in various ways to perform their functions. For instance, FIG. 17 shows a flowchart 1700 providing a process for coordinating log switching and the application of virtual disk replication logs to replica storage, according to an example embodiment. In embodiments, first replication coordinator 1606 may operate according to flowchart 1700, second replication coordinator 1608 may operate according to flowchart 1700, or replication coordinators 1606 and 1608 may cooperate to perform flowchart 1700. Flowchart 1700 is described as follows with respect to FIG. 16. Further structural and operational embodiments will be apparent to persons skilled in the relevant art(s) based on the following description.

Flowchart 1700 begins with step 1702. In step 1702, an instruction is transmitted to perform a cycle of log switching of a plurality of logs associated with a first plurality of virtual disks at a plurality of computing devices. For example, as shown in FIG. 16, replication coordinator 1608 at computing device 1602 (replica side 1626) may generate a log switching instruction 1628 that is received over a network by replication coordinator 1606 at computing device 702 (primary side 1624). Log switching instruction 1628 is an instruction to perform log switching at the various computing devices containing storage associated with tracking logs. Log switching instruction 1628 may be transmitted in any manner, such as a control code (e.g., over a cluster network), an HTTP request (e.g., over a LAN, WAN, etc.) or in another form.

As shown in FIG. 16, in response to receiving log switching instruction 1628, replication coordinator 1606 may generate a second log switching instruction 1618, which is received by WOCT coordinator 706. Log switching instruction 1618 instructs WOCT coordinator 706 to perform a cycle of log switching. In response to receiving log switching instruction 1618, WOCT coordinator 706 may cause a cycle of log switching to be performed in any manner described herein, such as according to flowchart 800 (FIG. 8), etc.

Note that in another embodiment, replication coordinator 1606 may generate log switching instruction 1618 without having received log switching instruction 1628 from replication coordinator 1608. In embodiments, replication coordinator 1606 and/or replication coordinator 1608 may cause a cycle of log switching to be performed (e.g., by generating a log switching instruction) at any time, which may be periodically, at random times, at predetermined times (e.g., according to a schedule), when VHD request queues 322 and/or log request queues 342 (FIG. 3) are becoming full, based on an amount of storage traffic (e.g., perform log switching more frequently when data storage events are occurring more often), and/or in any other manner.

In step 1704, a plurality of logs is received from the computing devices in response to performance of the cycle of log switching. For instance, as shown in FIG. 16, replication coordinator 1608 at computing device 1602 (replica side 1626) receives replication log(s) 1622a from computing device 704a, replication log(s) 1622b from computing device 704b (FIG. 7; not shown in FIG. 16), and may receive further replication logs from further computing devices on primary side 1624. The replication logs are the logs that were switched-out due to performance of log switching as described elsewhere herein, in response to step 1702. Accordingly, the replication logs relate to data stored in primary storage, across multiple computing devices and virtual disks, and that may need write order dependency maintained storage-wide.

The replication logs may be received from agents at the computing devices (e.g., agent 708a, etc.), from log request processing modules 344 at the computing devices, and/or from other source at the computing devices. In such an embodiment, the replication logs are received directly and individually from the computing devices where the logs were generated and switched out, through multiple channels, rather than collecting the replication logs at one point. This may enable faster providing of the replication logs to replication coordinator 1608 (replica side 1626), rather than collecting the replication logs at replication coordinator 1606 (primary side 1624), and then passing them to replication coordinator 1608, although this may be done in an alternative embodiment. Receiving the logs from the individual computing devices enables greater scalability for system 1600.

Referring back to FIG. 17, in step 1706, each log of the received plurality of logs is tagged to at least indicate the cycle of log switching. In an embodiment, replication coordinator 1608 may include a log file tagger 1610. Log file tagger 1610 is configured to tag each received replication log at least with information that identifies the particular cycle of log switching (e.g., with a cycle identifier/code). In this manner, the replication logs of a particular cycle may be applied to replica storage at a same time to enable write order to be maintained. Log file tagger 1610 may tag the replication logs in any manner, such as by providing an indication of the log switching cycle in a header of the log file, in the body of the log file, as metadata associated with the log file, in a file name of the log file, and/or in any other manner.

Note that in another embodiment, each agent 708a, etc. may include a log file tagger 1610 that tags replication logs 1622a, 1622b, etc. prior to being transmitted from primary side 1624. In still another embodiment, each computing device 704a, etc. may include a log file tagger 1610 that is separate from the corresponding agent 708a, etc. at the computing device.

In step 1708, the tagged plurality of logs is provided to enable a write-order consistent storage point in a second plurality of virtual disks. In an embodiment, as shown in FIG. 16, replication coordinator 1608 may transmit tagged replication logs 1624, which includes versions of replication logs 1622a, 1622b, etc. that have been tagged with log switching cycle identifiers. In an embodiment, log file processing agent 1612a at computing device 1604a, and further log file processing agents at further computing devices, may receive tagged replication logs 1624. Tagged replication logs 1624 may be transmitted to the log file processing agents in any manner, such as being transmitted over a cluster network, over a LAN, WAN, etc., or in another form.

In an embodiment, each computing device receives one or more tagged replication logs of tagged replication logs 1624 that is/are applicable to the replica storage associated therewith. For instance, in the example of FIG. 16, computing device 1604a may receive tagged versions of replication logs 112a and 112b switched out from computing device 704a, in the case where virtual disk(s) 1616a of replica storage 1614a correspond to virtual disk(s) 106a of storage 710a, and virtual disk(s) 1616b of replica storage 1614b correspond to virtual disk(s) 106b of storage 710b.

In an embodiment, log file processing agents 1612a, etc. at the respective computing devices apply the storage access requests included in the received tagged replication logs to the corresponding virtual disks in virtual storage. Replication coordinator 1608 coordinates applying of the replication logs such that replication logs that are tagged with the same cycle are applied by log file processing agents 1612a, etc. in parallel. Replication coordinator 1608 may require that log file processing agents 1612a, etc. all transmit a confirmation/response to replication coordinator 1608 that each of their replication logs were successfully applied to their replica storage before replication coordinator 1608 will allow tagged replication logs from a next cycle of log switching on primary side 1624 to begin to be applied to replica storage on replica side 1626 by the log file processing agents.

In this manner, the data in the virtual disks is updated and synchronized with the corresponding virtual disks in primary storage at a point in time (e.g., the time at which log switching is initiated for a cycle). For instance, a tagged version of a replication log 112a switched out from storage 710a may include storage access requests that were applied to one of virtual disk(s) 106a. Log file processing agent 1612a is configured to apply the storage access request (e.g., data writes) to the corresponding one of virtual disk(s) 1616a in replica storage 1614a. In this manner, the replica virtual disk of virtual disk(s) 1616a is brought forward in time to synchronization with the corresponding primary virtual disk of virtual disk(s) 106a (assuming further writes have not been performed on the primary virtual disk). As such, a multi-VM write-order consistent point is created in replica storage 1614a, 1614b, etc. on replica side 1626. The tagging enables gathering/collation on replica side 1626 of all logs created in the same log switching cycle on primary side 1624. Log file processing agents across the computing devices on replica side 1626 perform similar operations on their replica storage to bring their respective virtual disks in synchronization with the corresponding virtual disks in primary storage.

Accordingly, embodiments provide a consistent point-in-time for an application distributed across multiple hosts to orchestrate replication of the data streams from primary-site hosts to secondary-site (replica) hosts. The orchestrator (e.g., replication coordinator 1606) for each multi-stream application on the primary-site coordinates with its counterpart (e.g., replication coordinator 1608) on the secondary-site to initiate and drive replication cycles. For achieving near-sync RPO (recovery point objective), the orchestration mechanism imposes relatively little overhead and provides high parallelism of replication channels by offloading the actual data transfer between primary and secondary hosts of each data stream. In one application, the log switching techniques of the prior section may be leveraged to produce a write order consistent point-in-time across the data streams. The storage changes are replicated according to embodiments of the current section to the target replica storage, and create a point-in-time copy for purposes of failover/test, failover etc. For a group of computing devices, it is desirable to identify recovery points in time across the replication streams of all computing devices that belong to the same replication cycle. An orchestrator (replication coordinator) on the secondary site keeps track of changes received at all computing devices of a group on the primary side during a replication cycle, determines if a recovery point can be produced, and keeps track of all such recovery points suitable for failover of a corresponding computing device group on the secondary site. The orchestrator is also resilient to one or more computer devices falling behind, or failing completely, and provides a framework for replication of all computing devices in a group to be synchronized.

Note that in embodiments, primary side and replica side replication coordinators may be configured to handle failures at each stage, such as a failure during the generation of write-order consistent logs during log switching, a failure to transmit a subset/all logs to the replica side, a failure to apply logs on the replica side, etc. Furthermore, when a subset of primary side computing devices fail to participate in a log switching/replication cycle, the replication coordinators may be configured to support the transmitting of the logs of/from the other (non-failing) primary side computing devices while the failing subset auto-recovers (or is manually recovered). These features, when present, enable the multi-stream replication scheme to be fault-tolerant, having an ability to (which may be automatic) recover from such failures that are common and/or expected in a distributed system.

V. Example Mobile and Stationary Device Embodiments

Virtual machine 104, SRPM 108, RMM 110, storage write control module 208, VHD interface 304, VHD parser 306, VHD interface 308, IOCTL handler 312, VHD request processing module 324, log request processing module 344, VMMS 340, WOCT coordinator 706, agent 708a, agent 708b, WOCT coordinator 900, log switching initiator 902, log switching manager 904, replication coordinator 1606, replication coordinator 1608, log file tagger 1610, log file processing agent 1612a, process 400, state diagram 500, process 600, flowchart 700, flowchart 800, flowchart 1000, flowchart 1300, step 1402, flowchart 1500, and flowchart 1700 may be implemented in hardware, or hardware combined with software and/or firmware. For example, virtual machine 104, SRPM 108, RMM 110, storage write control module 208, VHD interface 304, VHD parser 306, VHD interface 308, IOCTL handler 312, VHD request processing module 324, log request processing module 344, VMMS 340, WOCT coordinator 706, agent 708a, agent 708b, WOCT coordinator 900, log switching initiator 902, log switching manager 904, replication coordinator 1606, replication coordinator 1608, log file tagger 1610, log file processing agent 1612a, process 400, state diagram 500, process 600, flowchart 700, flowchart 800, flowchart 1000, flowchart 1300, step 1402, flowchart 1500, and/or flowchart 1700 may be implemented as computer program code/instructions configured to be executed in one or more processors and stored in a computer readable storage medium. Alternatively, virtual machine 104, SRPM 108, RMM 110, storage write control module 208, VHD interface 304, VHD parser 306, VHD interface 308, IOCTL handler 312, VHD request processing module 324, log request processing module 344, VMMS 340, WOCT coordinator 706, agent 708a, agent 708b, WOCT coordinator 900, log switching initiator 902, log switching manager 904, replication coordinator 1606, replication coordinator 1608, log file tagger 1610, log file processing agent 1612a, process 400, state diagram 500, process 600, flowchart 700, flowchart 800, flowchart 1000, flowchart 1300, step 1402, flowchart 1500, and/or flowchart 1700 may be implemented as hardware logic/electrical circuitry.

For instance, in an embodiment, one or more, in any combination, of virtual machine 104, SRPM 108, RMM 110, storage write control module 208, VHD interface 304, VHD parser 306, VHD interface 308, IOCTL handler 312, VHD request processing module 324, log request processing module 344, VMMS 340, WOCT coordinator 706, agent 708a, agent 708b, WOCT coordinator 900, log switching initiator 902, log switching manager 904, replication coordinator 1606, replication coordinator 1608, log file tagger 1610, log file processing agent 1612a, process 400, state diagram 500, process 600, flowchart 700, flowchart 800, flowchart 1000, flowchart 1300, step 1402, flowchart 1500, and/or flowchart 1700 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 18:
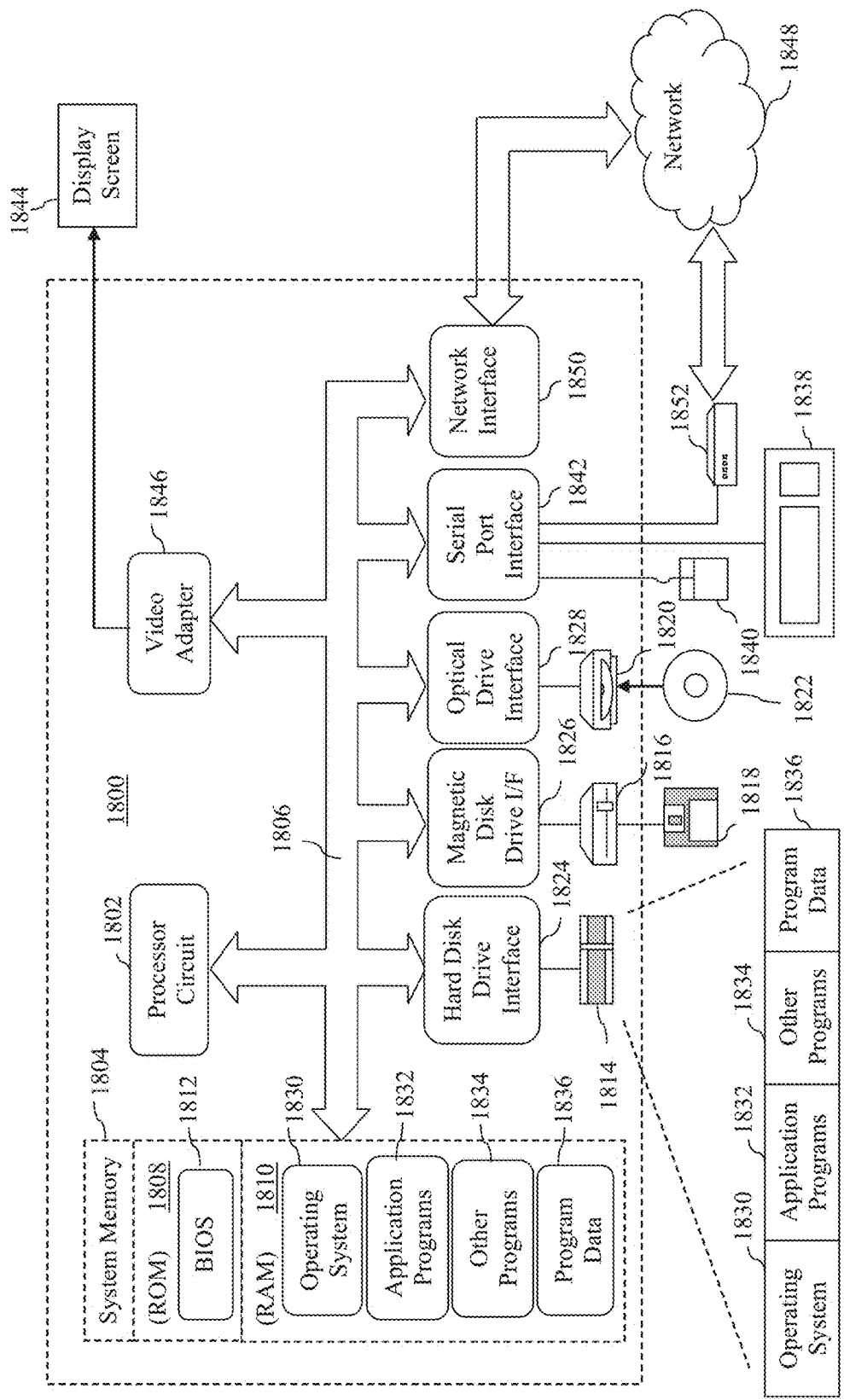
FIG. 18 shows a block diagram of an example computing device that may be used to implement embodiments.

FIG. 18 depicts an exemplary implementation of a computing device 1800 in which embodiments may be implemented. For example, system 100, system 200, computing device 702, computing device 704a, computing device 704b, computing device 1602, and/or computing device 1604a may be implemented in one or more computing devices similar to computing device 1800 in mobile or stationary computer embodiments, including one or more features of computing device 1800 and/or alternative features. The description of computing device 1800 provided herein is provided for purposes of illustration, and is not intended to be limiting. Embodiments may be implemented in further types of computer systems, as would be known to persons skilled in the relevant art(s).

As shown in FIG. 18, computing device 1800 includes one or more processors, referred to as processor circuit 1802, a system memory 1804, and a bus 1806 that couples various system components including system memory 1804 to processor circuit 1802. Processor circuit 1802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1802 may execute program code stored in a computer readable medium, such as program code of operating system 1830, application programs 1832, other programs 1834, etc. Bus 1806 represents one or more of any of several types of bus structures, including a memory bus or memory controller, a peripheral bus, an accelerated graphics port, and a processor or local bus using any of a variety of bus architectures. System memory 1804 includes read only memory (ROM) 1808 and random access memory (RAM) 1810. A basic input/output system 1812 (BIOS) is stored in ROM 1808.

Computing device 1800 also has one or more of the following drives: a hard disk drive 1814 for reading from and writing to a hard disk, a magnetic disk drive 1816 for reading from or writing to a removable magnetic disk 1818, and an optical disk drive 1820 for reading from or writing to a removable optical disk 1822 such as a CD ROM, DVD ROM, or other optical media. Hard disk drive 1814, magnetic disk drive 1816, and optical disk drive 1820 are connected to bus 1806 by a hard disk drive interface 1824, a magnetic disk drive interface 1826, and an optical drive interface 1828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1830, one or more application programs 1832, other programs 1834, and program data 1836. Application programs 1832 or other programs 1834 may include, for example, computer program logic (e.g., computer program code or instructions) for implementing virtual machine 104, SRPM 108, RMM 110, storage write control module 208, VHD interface 304, VHD parser 306, VHD interface 308, IOCTL handler 312, VHD request processing module 324, log request processing module 344, VMMS 340, WOCT coordinator 706, agent 708a, agent 708b, WOCT coordinator 900, log switching initiator 902, log switching manager 904, replication coordinator 1606, replication coordinator 1608, log file tagger 1610, log file processing agent 1612a, process 400, state diagram 500, process 600, flowchart 700, flowchart 800, flowchart 1000, flowchart 1300, step 1402, flowchart 1500, and/or flowchart 1700 (including any suitable step of processes 400, 600, state machine 500, flowcharts 700, 800, 1000, 1300, 1500, 1700), and/or further embodiments described herein.

A user may enter commands and information into the computing device 1800 through input devices such as keyboard 1838 and pointing device 1840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1802 through a serial port interface 1842 that is coupled to bus 1806, but may be connected by other interfaces, such as a parallel port, game port, or a universal serial bus (USB).

A display screen 1844 is also connected to bus 1806 via an interface, such as a video adapter 1846. Display screen 1844 may be external to, or incorporated in computing device 1800. Display screen 1844 may display information, as well as being a user interface for receiving user commands and/or other information (e.g., by touch, finger gestures, virtual keyboard, etc.). In addition to display screen 1844, computing device 1800 may include other peripheral output devices (not shown) such as speakers and printers.

Computing device 1800 is connected to a network 1848 (e.g., the Internet) through an adaptor or network interface 1850, a modem 1852, or other means for establishing communications over the network. Modem 1852, which may be internal or external, may be connected to bus 1806 via serial port interface 1842, as shown in FIG. 18, or may be connected to bus 1806 using another interface type, including a parallel interface.

As used herein, the terms "computer program medium," "computer-readable medium," and "computer-readable storage medium" are used to generally refer to physical hardware media such as the hard disk associated with hard disk drive 1814, removable magnetic disk 1818, removable optical disk 1822, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 1832 and other programs 1834) may be stored on the hard disk, magnetic disk, optical disk, ROM, RAM, or other hardware storage medium. Such computer programs may also be received via network interface 1850, serial port interface 1842, or any other interface type. Such computer programs, when executed or loaded by an application, enable computing device 1800 to implement features of embodiments discussed herein. Accordingly, such computer programs represent controllers of the computing device 1800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

VI. Example Embodiments

In one embodiment, a method in a write order consistent tracking (WOCT) coordinator is provided, comprising: initiating a cycle of a log switching of a plurality of logs associated with a plurality of virtual disks at a plurality of computing devices, the virtual disks storing data that is write order dependent amongst the virtual disks, each computing device of the plurality of computing device including at least one of a virtual disk of the plurality of virtual disks that receives storage access requests from an application, the storage access requests including write requests, and a log of the plurality of logs corresponding to the virtual disk that receives log queue entries corresponding to the storage access requests; and coordinating the cycle of the log switching of the plurality of logs at the plurality of computing devices across the virtual disks to maintain request ordering for write order dependent requests.

In an embodiment, the coordinating comprises: enacting a plurality of stages to cause the switching of the plurality of logs at the plurality of computing devices.

In an embodiment, the initiating comprises: taking an exclusive lock on each of a plurality of begin stage lock files, each begin stage lock file associated with a corresponding stage of the plurality of stages; and transmitting a log switching initiation instruction to a plurality of agents at the computing devices, each computing device including a corresponding agent of the plurality of agents.

In an embodiment, the initiating further comprises: receiving a response from each of the agents, each response received from an agent of the plurality agents indicating that the agent took a shared lock on each of a plurality of end stage lock files, each end stage lock file associated with a corresponding stage of the plurality of stages.

In an embodiment, each stage of the plurality of stages is enacted by performing releasing the exclusive lock on the associated begin stage lock file to signal the beginning of the stage to the agents, attempting to take an exclusive lock on the associated end stage lock file, taking the exclusive lock on the associated end stage lock file when enabled by the agents having released all shared locks on the associated end stage lock file to signify completion of the stage by the agents, and transitioning to enacting a next stage until a final stage of the plurality of stages is completed.

In an embodiment, the enacting a plurality of stages comprises: enacting a first stage during which a new log is initialized at each computing device of the plurality of computing devices; enacting a second stage during which received log queue entries are blocked from being received by the logs at the plurality of computing devices; enacting a third stage during which the new log is configured to be used to receive the log queue entries at each computing device of the plurality of computing devices, and received log queue entries are unblocked from being received by the logs at the plurality of computing devices; and enacting a fourth stage during which the log switching is finalized.

In an embodiment, the coordinating comprises: transmitting control codes and/or messages to a plurality of agents at the computing devices to enact the plurality of stages, each computing device including a corresponding agent of the plurality of agents.

In an embodiment, each stage of the plurality of stages is enacted by performing transmitting a control code to the plurality of agents; awaiting a response to the transmitted control code from each of the plurality of agents; aborting the log switching if at least one of the agents does not respond with the awaited response within a predetermined time period for the plurality of stages to be completed; and transitioning to enacting a next stage if all agents respond within the predetermined time period, said transitioning including completing the log switching when a final stage of the plurality of stages is completed.

In another embodiment, a write order consistent tracking (WOCT) coordinator comprises: a log switching initiator configured to communicate with a plurality of agents at a plurality of computing devices to initiate cycles of a log switching of a plurality of logs associated with a plurality of virtual disks at the plurality of computing devices, a cycle of the log switching including a switching out of each current log for a corresponding new log, each computing device of the plurality of computing device including at least one of a virtual disk of the plurality of virtual disks that receives storage access requests from an application, the storage access requests including write requests, and a log of the plurality of logs corresponding to the virtual disk that receives log queue entries corresponding to the storage access requests; and a log switching manager configured to coordinate the cycles of the log switching of the plurality of logs at the plurality of computing devices to maintain request ordering for write order dependent requests across virtual disks.

In an embodiment, the log switching manager is configured to enact a plurality of stages to cause a cycle of the switching of the plurality of logs at the plurality of computing devices.

In an embodiment, for a cycle of the log switching, the log switching initiator is configured to: take an exclusive lock on each of a plurality of begin stage lock files, each begin stage lock file associated with a corresponding stage of the plurality of stages; and transmit a log switching initiation instruction to the plurality of agents at the computing devices to initiate the log switching.

In an embodiment, the log switching initiator is configured to receive a response from each of the agents, each response received from an agent of the plurality agents indicating that the agent took a shared lock on each of a plurality of end stage lock files, each end stage lock file associated with a corresponding stage of the plurality of stages.

In an embodiment, to enact each stage of the plurality of stages, the log switching manager is configured to: release the exclusive lock taken by the log switching initiator on the associated begin stage lock file to signal the beginning of the stage to the agents, attempt to take an exclusive lock on the associated end stage lock file, take the exclusive lock on the associated end stage lock file when enabled by the agents having released all shared locks on the associated end stage lock file to signify completion of the stage by the agents, and transition to enacting a next stage until a final stage of the plurality of stages is completed.

In an embodiment, to enact each stage of the plurality of stages, the log switching manager is configured to: transmit a control code to the plurality of agents; await a response to the transmitted control code from each of the plurality of agents; abort the log switching if at least one of the agents does not respond with the awaited response within a predetermined time period for the plurality of stages to be completed; and transition to enacting a next stage if all agents respond within the predetermined time period, the log switching being completed when a final stage of the plurality of stages is completed.

In another embodiment, a method in a replication coordinator is provided, comprising: transmitting an instruction to perform a cycle of log switching of a plurality of logs associated with a first plurality of virtual disks at a plurality of computing devices on a primary side, the first plurality of virtual disks storing data of a distributed application, each log of the plurality of logs associated with a virtual disk of the first plurality of virtual disks, each virtual disk of the first plurality of virtual disks configured to receive storage access requests from the distributed application, and the corresponding log configured to receive log queue entries corresponding to the storage access requests; receiving a plurality of logs from the computing devices in response to performance of the cycle of log switching; tagging each log of the received plurality of logs to at least indicate the cycle of log switching; providing the tagged plurality of logs to enable a write-order consistent storage point in a second plurality of virtual disks on a replica side, the write-order consistent storage point being a replica of the first plurality of virtual disks on the primary side at a point in time, the storage access requests applicable to synchronize the second plurality of virtual disks with the first plurality of virtual disks.

In an embodiment, the transmitting comprises: instructing a write order consistent tracking (WOCT) coordinator to coordinate the cycle of log switching.

In an embodiment, the providing comprises: transmitting the tagged plurality of logs to a second replication coordinator configured to coordinate application of the storage access requests to the second plurality of virtual disks, the first and second replication coordinators each configured to handle failures, including at least one of handling a failure during generation of the plurality of logs, a failure to receive a subset of the plurality of logs at the replica side, or a failure to apply all of the plurality of logs to the second plurality of virtual disks on the replica side.

In an embodiment, when a subset of the plurality of computing devices on the primary side fails to participate the cycle of log switching, the first and second replication coordinators support transmitting the plurality of logs of others of the plurality of computing devices to the replica side while the subset recovers.

In an embodiment, the providing comprises: providing the tagged plurality of logs to a plurality of agents at a second plurality of computing devices to apply the storage access requests to the second plurality of virtual disks; and the method further comprises: awaiting a confirmation from the plurality of agents that the tagged plurality of logs were successfully applied to the second plurality of virtual disks; and enabling a second set of tagged logs to be applied to the second plurality of virtual disks in response to receiving the confirmation from the plurality of agents.

In an embodiment, the receiving a plurality of logs from the computing devices in response to performance of the cycle of log switching comprises: receiving each log of the plurality of logs individually from the corresponding computing device of the plurality of computing devices on a primary side.

VII. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a write order consistent tracking (WOCT) coordinator, comprising:
    initiating a cycle of a log switching of a plurality of logs associated with a plurality of virtual disks at a plurality of computing devices, the initiating including taking an exclusive lock on each of a plurality of begin stage lock files, the virtual disks storing data that is write order dependent amongst the virtual disks, each computing device of the plurality of computing devices including at least one of
        a virtual disk of the plurality of virtual disks that receives storage access requests from an application, the storage access requests including write requests, and
        a log of the plurality of logs corresponding to the virtual disk that receives log queue entries corresponding to the storage access requests; and
    coordinating the cycle of the log switching of the plurality of logs at the plurality of computing devices across the virtual disks to maintain request ordering for write order dependent requests.

2. The method of claim 1, wherein said coordinating comprises:
    enacting a plurality of stages to cause the switching of the plurality of logs at the plurality of computing devices.

3. The method of claim 2, wherein
    each begin stage lock file is associated with a corresponding stage of the plurality of stages; and
    wherein said initiating comprises:
        transmitting a log switching initiation instruction to a plurality of agents at the computing devices, each computing device including a corresponding agent of the plurality of agents.

4. The method of claim 3, wherein said initiating further comprises:
    receiving a response from each of the agents, each response received from an agent of the plurality agents indicating that the agent took a shared lock on each of a plurality of end stage lock files, each end stage lock file associated with a corresponding stage of the plurality of stages.

5. The method of claim 4, wherein each stage of the plurality of stages is enacted by performing:
    releasing the exclusive lock on the associated begin stage lock file to signal the beginning of the stage to the agents,
    attempting to take an exclusive lock on the associated end stage lock file,
    taking the exclusive lock on the associated end stage lock file when enabled by the agents having released all shared locks on the associated end stage lock file to signify completion of the stage by the agents, and
    transitioning to enacting a next stage until a final stage of the plurality of stages is completed.

6. The method of claim 2, wherein said coordinating comprises:
    transmitting control codes and/or messages to a plurality of agents at the computing devices to enact the plurality of stages, each computing device including a corresponding agent of the plurality of agents.

7. The method of claim 6, wherein each stage of the plurality of stages is enacted by performing:
    transmitting a control code to the plurality of agents;
    awaiting a response to the transmitted control code from each of the plurality of agents;
    aborting the log switching if at least one of the agents does not respond with the awaited response within a predetermined time period for the plurality of stages to be completed; and
    transitioning to enacting a next stage if all agents respond within the predetermined time period, said transitioning including completing the log switching when a final stage of the plurality of stages is completed.

8. A write order consistent tracking (WOCT) coordinator, comprising:
    at least one processor circuit; and
    memory that stores instructions for operations, the instructions defining:
        a log switching initiator configured to communicate with a plurality of agents at a plurality of computing devices to initiate cycles of a log switching of a plurality of logs associated with a plurality of virtual disks at the plurality of computing devices and take an exclusive lock on each of a plurality of begin stage lock files, a cycle of the log switching including a switching out of each current log for a corresponding new log, each computing device of the plurality of computing devices including at least one of
            a virtual disk of the plurality of virtual disks that receives storage access requests from an application, the storage access requests including write requests, and
            a log of the plurality of logs corresponding to the virtual disk that receives log queue entries corresponding to the storage access requests; and
        a log switching manager configured to coordinate the cycles of the log switching of the plurality of logs at the plurality of computing devices to maintain request ordering for write order dependent requests across virtual disks.

9. The WOCT coordinator of claim 8, wherein the log switching manager is configured to enact a plurality of stages to cause a cycle of the switching of the plurality of logs at the plurality of computing devices.

10. The WOCT coordinator of claim 9, wherein
    each begin stage lock file is associated with a corresponding stage of the plurality of stages; and
    wherein, for a cycle of the log switching, the log switching initiator is configured to:
    transmit a log switching initiation instruction to the plurality of agents at the computing devices to initiate the log switching.

11. The WOCT coordinator of claim 10, wherein the log switching initiator is configured to receive a response from each of the agents, each response received from an agent of the plurality agents indicating that the agent took a shared lock on each of a plurality of end stage lock files, each end stage lock file associated with a corresponding stage of the plurality of stages.

12. The WOCT coordinator of claim 11, wherein to enact each stage of the plurality of stages, the log switching manager is configured to:
    release the exclusive lock taken by the log switching initiator on the associated begin stage lock file to signal the beginning of the stage to the agents,
    attempt to take an exclusive lock on the associated end stage lock file,
    take the exclusive lock on the associated end stage lock file when enabled by the agents having released all shared locks on the associated end stage lock file to signify completion of the stage by the agents, and transition to enacting a next stage until a final stage of the plurality of stages is completed.

13. A method in a write order consistent tracking (WOCT) coordinator, comprising:
    initiating a cycle of a log switching of a plurality of logs associated with a plurality of virtual disks at a plurality of computing devices, the virtual disks storing data that is write order dependent amongst the virtual disks, each computing device of the plurality of computing devices including at least one of
        a virtual disk of the plurality of virtual disks that receives storage access requests from an application, the storage access requests including write requests, and
        a log of the plurality of logs corresponding to the virtual disk that receives log queue entries corresponding to the storage access requests; and
    coordinating the cycle of the log switching of the plurality of logs at the plurality of computing devices across the virtual disks to maintain request ordering for write order dependent requests, said coordinating including enacting a plurality of stages to cause the switching of the plurality of logs at the plurality of computing devices, said enacting a plurality of stages comprising:
        enacting a first stage during which a new log is initialized at each computing device of the plurality of computing devices;
        enacting a second stage during which received log queue entries are blocked from being received by the logs at the plurality of computing devices;
        enacting a third stage during which the new log is configured to be used to receive the log queue entries at each computing device of the plurality of computing devices, and received log queue entries are unblocked from being received by the logs at the plurality of computing devices; and
        enacting a fourth stage during which the log switching is finalized.

14. A write order consistent tracking (WOCT) coordinator, comprising:
    at least one processor circuit; and
    memory that stores instructions for operations, the instructions defining:
        a log switching initiator configured to communicate with a plurality of agents at a plurality of computing devices to initiate cycles of a log switching of a plurality of logs associated with a plurality of virtual disks at the plurality of computing devices, a cycle of the log switching including a switching out of each current log for a corresponding new log, each computing device of the plurality of computing devices including at least one of
            a virtual disk of the plurality of virtual disks that receives storage access requests from an application, the storage access requests including write requests, and
            a log of the plurality of logs corresponding to the virtual disk that receives log queue entries corresponding to the storage access requests; and
        a log switching manager configured to:
            coordinate the cycles of the log switching of the plurality of logs at the plurality of computing devices to maintain request ordering for write order dependent requests across virtual disks; and
            enact a plurality of stages to cause a cycle of the switching of the plurality of logs at the plurality of computing devices;
    wherein to enact each stage of the plurality of stages, the log switching manager is configured to:
        transmit a control code to the plurality of agents;
        await a response to the transmitted control code from each of the plurality of agents;
        abort the log switching if at least one of the agents does not respond with the awaited response within a predetermined time period for the plurality of stages to be completed; and
        transition to enacting a next stage if all agents respond within the predetermined time period, the log switching being completed when a final stage of the plurality of stages is completed.

15. A method in a first replication coordinator, comprising:
    transmitting an instruction to perform a cycle of log switching of a plurality of logs associated with a first plurality of virtual disks at a plurality of computing devices on a primary side, the first plurality of virtual disks storing data of a distributed application, each log of the plurality of logs associated with a virtual disk of the first plurality of virtual disks, each virtual disk of the first plurality of virtual disks configured to receive storage access requests from the distributed application, and the corresponding log configured to receive log queue entries corresponding to the storage access requests;
    receiving a plurality of logs from the computing devices in response to performance of the cycle of log switching;
    tagging each log of the received plurality of logs to at least indicate the cycle of log switching; and
    providing the tagged plurality of logs to enable a write-order consistent storage point in a second plurality of virtual disks on a replica side by transmitting the tagged plurality of logs to a second replication coordinator, the write-order consistent storage point being a replica of the first plurality of virtual disks on the primary side at a point in time, the storage access requests applicable to synchronize the second plurality of virtual disks with the first plurality of virtual disks.

16. The method of claim 15, wherein said transmitting comprises:
    instructing a write order consistent tracking (WOCT) coordinator to coordinate the cycle of log switching.

17. The method of claim 15, wherein
    the second replication coordinator is configured to coordinate application of the storage access requests to the second plurality of virtual disks, the first and second replication coordinators each configured to handle failures, including at least one of handling a failure during generation of the plurality of logs, a failure to receive a subset of the plurality of logs at the replica side, or a failure to apply all of the plurality of logs to the second plurality of virtual disks on the replica side.

18. The method of claim 17, wherein when a subset of the plurality of computing devices on the primary side fails to participate the cycle of log switching, the first and second replication coordinators support transmitting the plurality of logs of others of the plurality of computing devices to the replica side while the subset recovers.

19. The method of claim 15, wherein said providing comprises:
    providing the tagged plurality of logs to a plurality of agents at a second plurality of computing devices to apply the storage access requests to the second plurality of virtual disks;

the method further comprising:
  awaiting a confirmation from the plurality of agents that the tagged plurality of logs were successfully applied to the second plurality of virtual disks; and
  enabling a second set of tagged logs to be applied to the second plurality of virtual disks in response to receiving the confirmation from the plurality of agents.

20. The method of claim 15, wherein said receiving comprises:
  receiving each log of the plurality of logs individually from the corresponding computing device on the primary side.

* * * * *